United States Patent
Morando et al.

(10) Patent No.: US 9,951,777 B2
(45) Date of Patent: Apr. 24, 2018

(54) MOLTEN METAL PUMP

(75) Inventors: Jorge A. Morando, Solon, OH (US); Jon Tipton, Aurora, OH (US); George S. Mordue, Ravenna, OH (US); Mark Bright, Sewickley, PA (US); Lennard Lutes, Copley, OH (US); Richard S. Henderson, Solon, OH (US); Chris T. Vild, Chagrin Falls, OH (US)

(73) Assignee: PYROTEK, INC., Spokane, WA (US)

( * ) Notice: Subject to any disclaimer, the term of this patent is extended or adjusted under 35 U.S.C. 154(b) by 2701 days.

(21) Appl. No.: 11/631,885

(22) PCT Filed: Jul. 7, 2005

(86) PCT No.: PCT/US2005/024044
§ 371 (c)(1),
(2), (4) Date: Mar. 11, 2008

(87) PCT Pub. No.: WO2006/014517
PCT Pub. Date: Feb. 9, 2006

(65) Prior Publication Data
US 2008/0253905 A1    Oct. 16, 2008

Related U.S. Application Data

(60) Provisional application No. 60/586,134, filed on Jul. 7, 2004, provisional application No. 60/607,644, filed (Continued)

(51) Int. Cl.
*F04D 29/62* (2006.01)
*F04D 7/06* (2006.01)
*F16D 1/08* (2006.01)

(52) U.S. Cl.
CPC .......... *F04D 7/065* (2013.01); *F04D 29/628* (2013.01); *F16D 1/0882* (2013.01); *F16D 1/0894* (2013.01); *Y10T 403/39* (2015.01)

(58) Field of Classification Search
CPC . F04D 7/06; F04D 7/065; F04D 29/62; Y10T 403/46; Y10T 403/4628; Y10T 403/4674; Y10T 403/46818
(Continued)

(56) References Cited

U.S. PATENT DOCUMENTS 5,452,646 A *  9/1995  Fahnle ............................. 91/492
5,993,728 A    11/1999  Vild
(Continued)

OTHER PUBLICATIONS

Supplementary European Search Report dated Feb. 9, 2011 in European Appln. No. 05769567.8, filed Jul. 7, 2005.

*Primary Examiner* — Essama Omgba
*Assistant Examiner* — Philip Stimpert
(74) *Attorney, Agent, or Firm* — Fay Sharpe LLP

(57) ABSTRACT

A molten metal pump includes an impeller, a pump base housing at least partially enclosing the impeller, a shaft connected to the impeller, a motor connected to the shaft, a motor mount plate for supporting the motor; and a post for connecting the motor mount plate to the pump base housing. The molten metal pump can include a connector that connects the post to the motor mount plate. The molten metal pump can include a socket for connecting the shaft to the motor. The shaft can comprise an assembly including an elongated metal rod having a first end and a second end and a metal non-circular drive member attached at the second end of the elongated metal rod. The impeller can include a cap member having a plurality of generally polygonally shaped inlet openings communicating with internal passages of the impeller, each inlet opening having an inner wall and an outer wall, the outer wall being longer than the inner wall, each inlet opening also including a leading wall and a trailing wall, the leading wall and the trailing wall each interconnecting the inner wall and the outer wall and each
(Continued)

being inclined such that an uppermost edge of each wall precedes a lowermost edge of each wall in a first rotational direction.

22 Claims, 16 Drawing Sheets

Related U.S. Application Data on Sep. 7, 2004, provisional application No. 60/675,828, filed on Apr. 28, 2005.

(58) Field of Classification Search
USPC .......... 417/360; 266/235; 222/590, 591, 609
See application file for complete search history.

(56) References Cited

U.S. PATENT DOCUMENTS

| | | |
|---|---|---|
| 6,439,860 B1 | 8/2002 | Greer |
| 6,524,006 B1 | 2/2003 | Thut |
| 6,562,286 B1 | 5/2003 | Lehman |
| 6,918,741 B2 | 7/2005 | Gilbert |
| 2001/0028846 A1 | 10/2001 | Vild et al. |
| 2003/0075844 A1* | 4/2003 | Mordue et al. ............... 266/239 |
| 2004/0080085 A1 | 4/2004 | Gilbert et al. |

\* cited by examiner

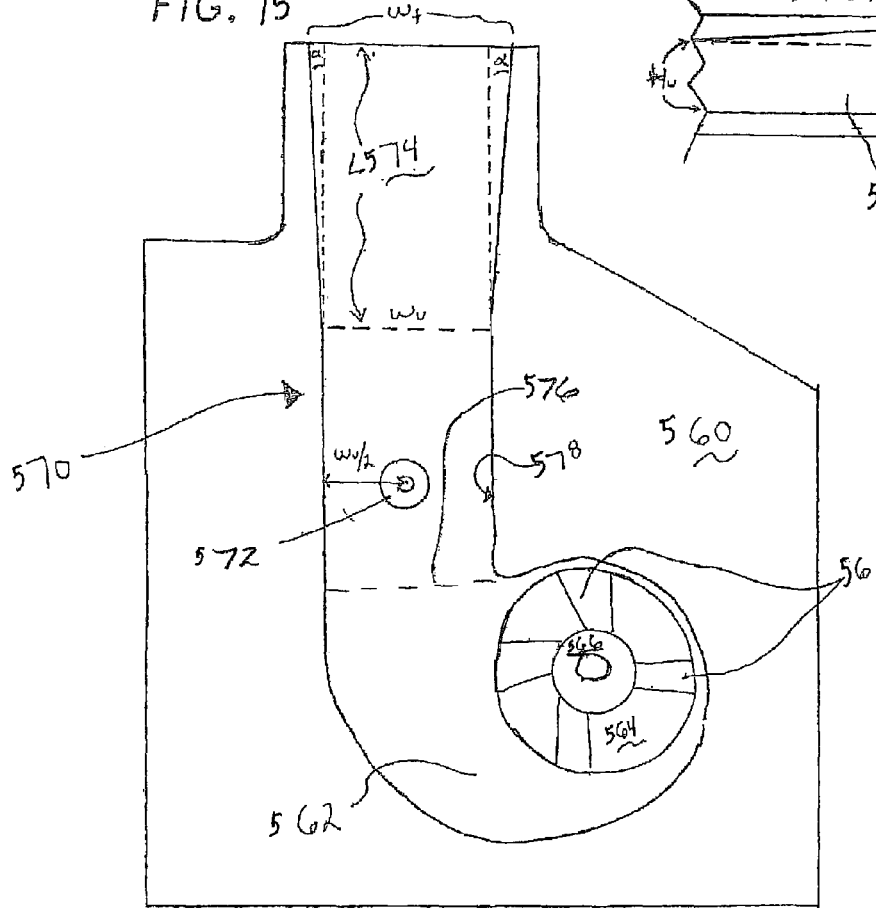
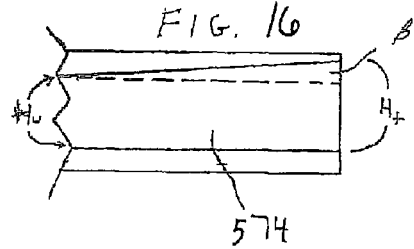
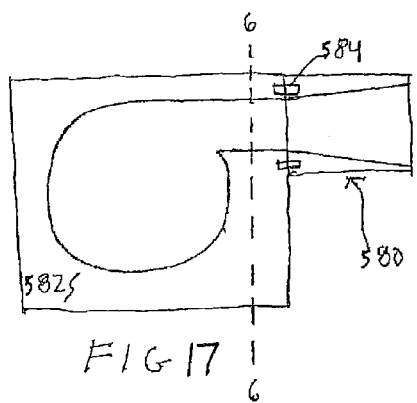
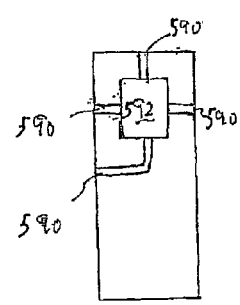

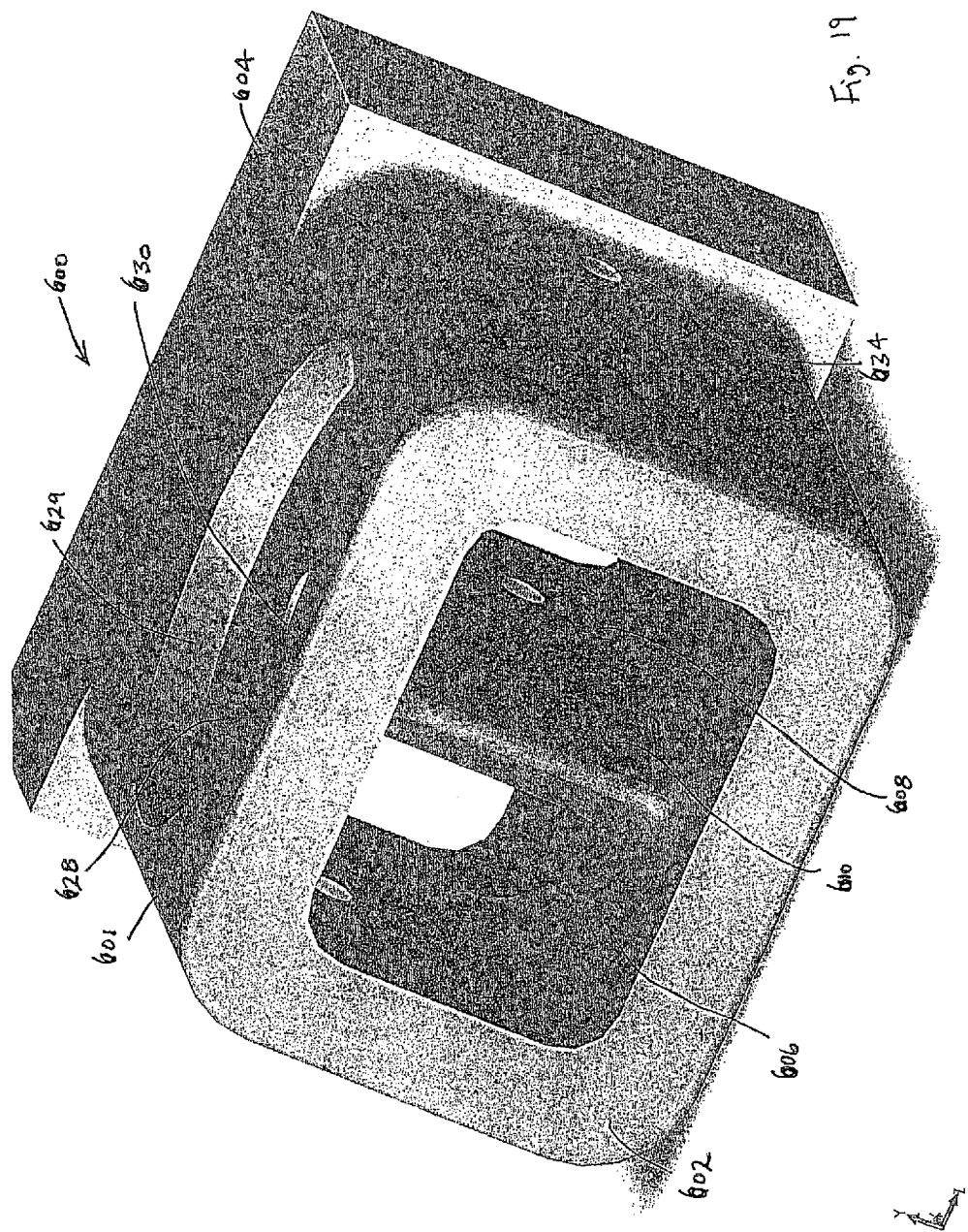

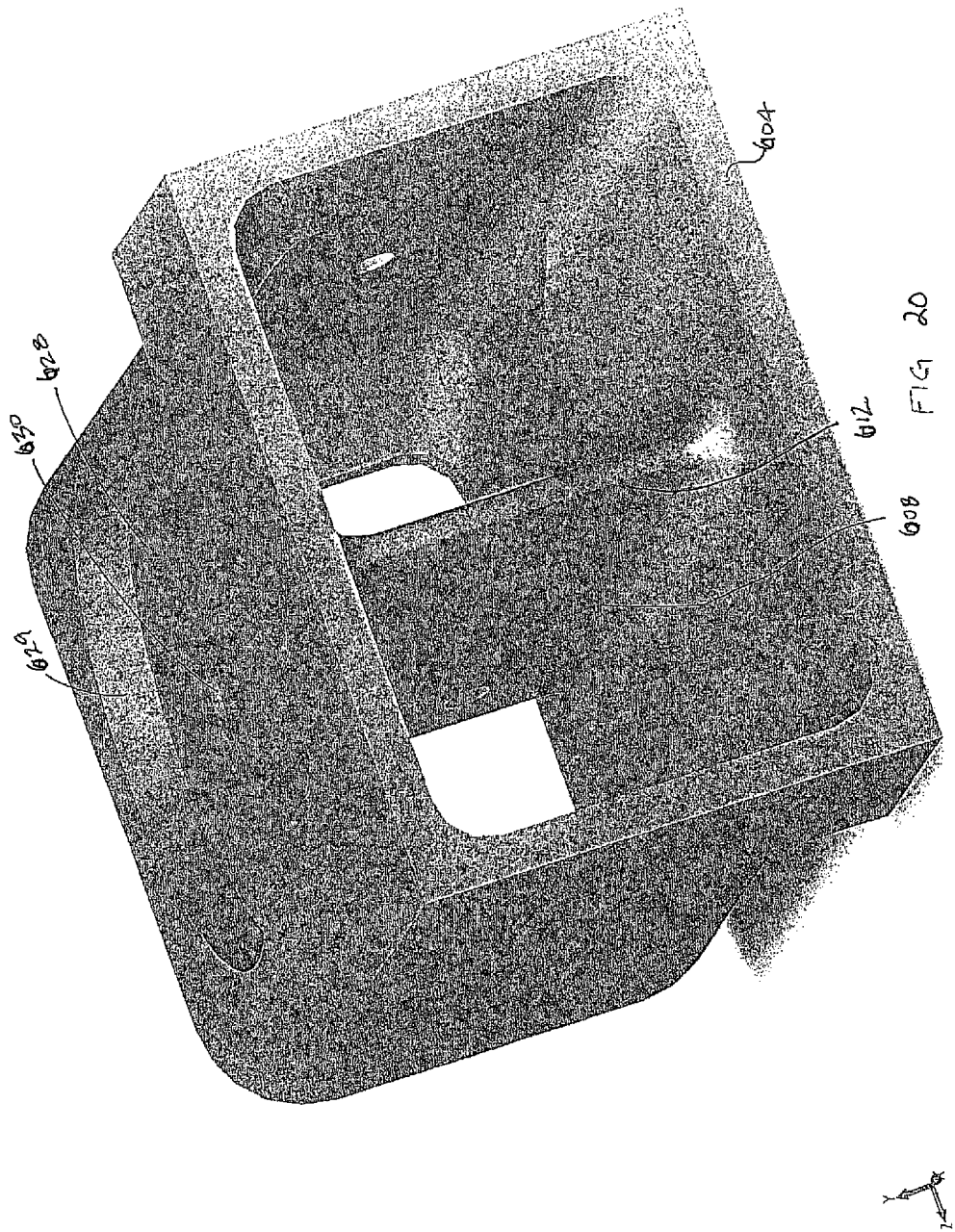

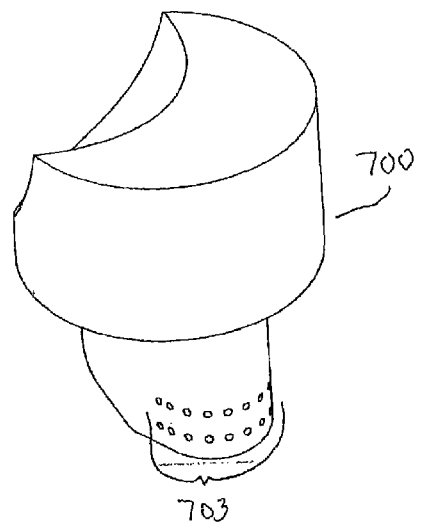
Fig. 23
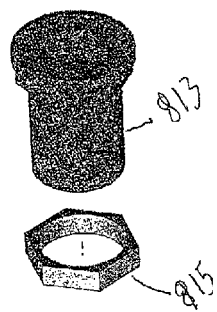
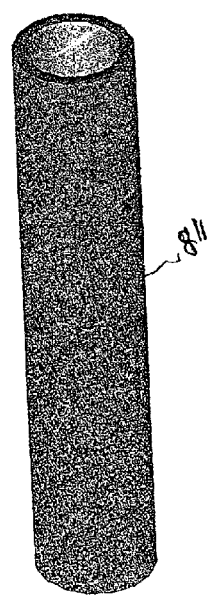
Fig. 24
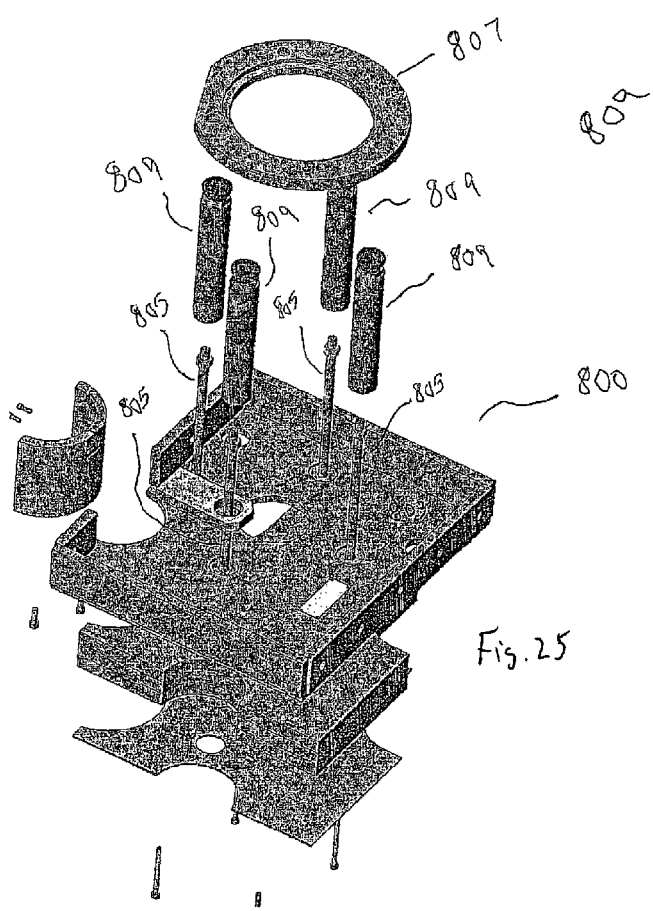
Fig. 25

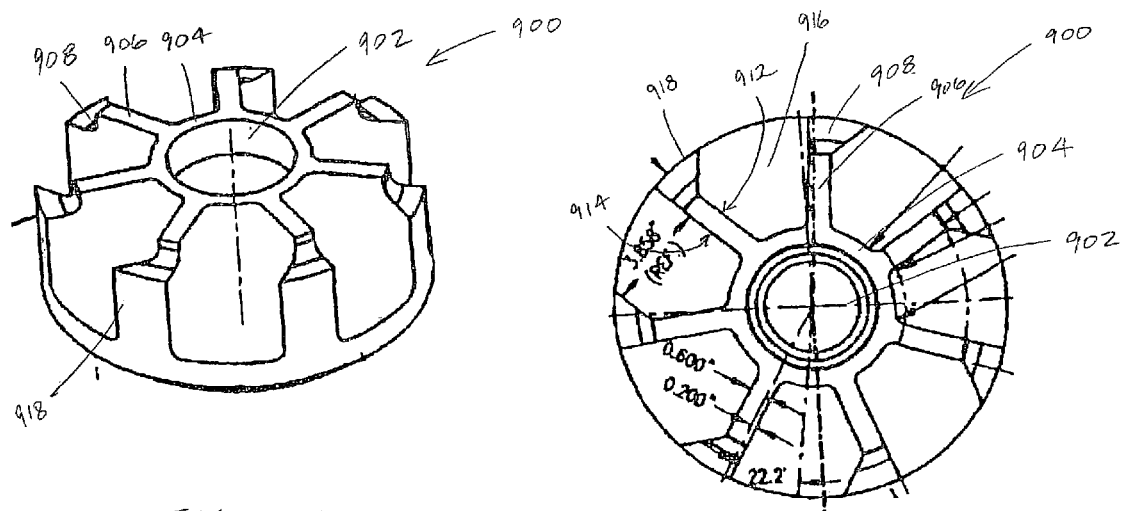
FIG. 27
FIG. 26
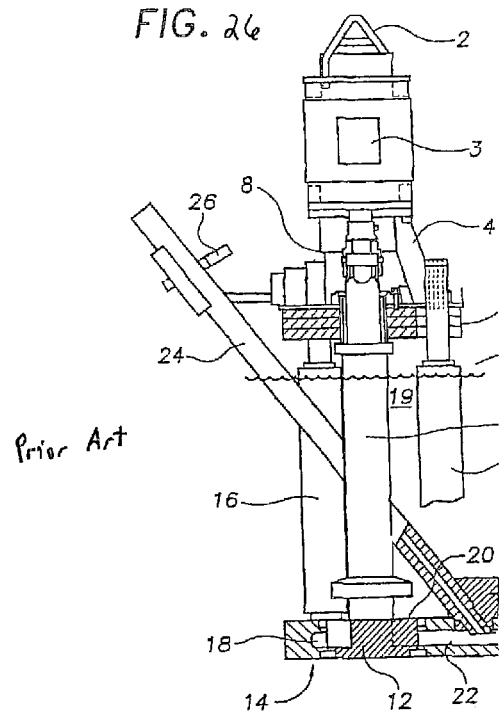
Prior Art
FIG. 28

MOLTEN METAL PUMP

INCORPORATION BY REFERENCE

Molten metal pumps have been described in U.S. Pat. Nos. 6,451,247; 6,354,796; and 6,254,340 each of which is herein incorporated by reference in its entirety. Gas discharge systems have been described in application Ser. Nos. 60/586,134, 60/607,644, and 60/675,828 which are herein incorporated by reference in their entirety.

BACKGROUND

In the course of processing molten materials, it is often necessary to transfer the molten materials from one vessel to another or to circulate the molten materials within a vessel. Pumps for processing molten materials are commonly used for these purposes. The pumps can also be used for other purposes, such as to inject purifying gases into the molten materials being pumped.

This invention relates to equipment for melting metal solids in a furnace, and to a method of melting metal solids in a furnace. More particularly, this invention relates to a molten metal pump facilitating the same.

In the non-ferrous metals industry, scrap recycling has become a way of economic life. In fact, long before environmental concerns and conservation began to drive scrap recycling efforts, recycling of aluminum, copper, zinc, lead and tin occupied a firm niche in the marketplace.

It is known to provide a holding portion of a furnace in which a body of molten metal is heated within an enclosure within which controlled combustion inhibits oxidation of the molten metal. Metal solids are introduced in a well annexed to the holding portion of the furnace and molten metal is transferred between the holding portion and the well in order to both maintain the temperature of the metal in the well and to deliver fresh metal to the holding portion. A molten metal pump is typically used to circulate the metal.

In the aluminum recycling industry in particular, refining processes are complicated greatly by the potency of aluminum to oxidize quite readily. Consequently, refining by oxidating reactions alone, common for other non-ferrous metals, is not feasible. Similarly, aluminum has exceptionally strong alloying characteristics with a variety of other metals, therefore, a broad range of metallic impurities must often be removed during processing. Along these lines, the removal of magnesium has become a particular focus within the industry. The ability to remove magnesium from molten aluminum is made possible by a favorable chemical reaction between magnesium and chlorine. The reaction of the molten aluminum with chlorine ultimately results in the formation of magnesium chloride which collects as a dross on the surface of the molten aluminum in the furnace and can be skimmed away. Although the molten aluminum must be treated, the ultimate goal in the aluminum cast house is to maintain and/or continuously improve product quality while pushing the production rate upward.

As generally outlined above, the secondary production of aluminum alloys often requires the use of a reactive gas to lower magnesium content and/or an inert gas to remove inclusions and hydrogen. Moreover, in order to achieve a desired final magnesium specification for the materials being processed, magnesium removal must occur during the melt refining process. In many operations today, gas injection pumps are considered the most effective tool for this task. Gas injection pumps of this type are depicted in U.S. Pat. Nos. 4,052,199 and 4,169,584, herein incorporated by reference.

Generally, those skilled in the art determine the effectiveness of reactivity by assessing the amount of chlorine that can be introduced into the molten aluminum per unit time. In this context, the maximum amount of chlorine solubilized in the molten aluminum per unit time is readily determinable because aluminum chloride gas which is not reactively scavenged by the magnesium evolves to the surface and decomposes to hydrogen chloride which is visible as a white vapor when in contact with air. Under extremely poor reaction conditions, chlorine itself may not be scavenged by the aluminum and can also be directly emitted from the bath. Given the potential for environmental damage and the hazardous nature of chlorine and hydrogen chloride gases, such results are highly undesirable.

Accordingly, commercial gas injection pumps are operated at a level to prevent such emissions. The primary mechanism for increasing the quantity of chlorine reacted and the corresponding rate at which the magnesium level is reduced, was to operate the pump at higher speeds. Of course, this proves very stressful on the dynamic components of the pump.

Various attempts have been made in the past to modify the discharge component of molten metal pumps. For example, U.S. Pat. No. 5,993,728 discloses the utilization of a convergent nozzle positioned in the outlet passage. Notwithstanding certain advantages provided by this design, the present invention is directed to an alternative approach wherein no or little restriction of the molten metal pathway is introduced.

Alternatively, as shown in U.S. Pat. No. 5,662,725, herein incorporated by reference, a gas-release device is shown. The gas-release device is preferably a rectangular graphite block. The block has a top surface, which is preferably planar or stepped, with an inlet bore formed therein. The inlet bore is preferably threaded and has an inside diameter dimensioned to threadingly receive external threads of a gas-injection tube. The inlet bore extends into the block. A passageway is formed through a side of the block. The passageway communicates with the inlet bore and is preferably cylindrical. A plug is provided, which is preferably formed of graphite, and is received in the passageway at the side to form a gas-tight seal.

Two outlet bores are formed and extend through the block to communicate with a passageway. The outlet bores are preferably cylindrical and are formed at a 0-60, and most preferably at a 45 downstream angle. The term downstream refers to that portion of the molten metal stream that has exited an outlet port and has passed the gas-release device and a 0 downstream angle means that the bore has no downstream angle. In other words, a 0 downstream angle means that the bore(s) is formed perpendicular to the flow of the molten metal stream and releases gas straight up into the stream. A 90 downstream angle, therefore, describes a bore(s) formed in a direction parallel to the direction that the stream flows.

The most preferred positions of the known gas-release block are adjacent the bottom of the outlet port when used in relation to a gas-release device positioned below the center of the outlet port. Accordingly, the gas-release device is positioned so as to not block the outlet port and restrict the flow of molten metal. However, drawbacks to such gas-release device is a larger diameter than the outlet port of the pump base; molten metal entering the device effectively is impeded by the mass of metal therein. This results in the pounding of flowing metal into the device, causing excessive vibrational stresses.

In the case where a molten material is melted in a reverbatory furnace, the furnace is typically provided with an external well in which a pump is disposed. When it is desired to remove molten materials from the vessel, a transfer pump is used. When it is desired to circulate molten materials within the vessel, a circulation pump is used. When it is desired to modify molten materials disposed within the vessel, a gas injection pump is used.

In each of these pumps, a rotatable impeller is disposed within a cavity or housing of a base member that is immersed in a molten material. Upon rotation of the impeller, the molten material is pumped through an outlet or discharge opening and processed in a manner dependent upon the type of pump being used. The impeller itself is supported for rotation in the base member by a rotatable shaft. The shaft is rotated by a motor provided at the shaft's upper end. Several support posts extend from a motor support platform to the base member for supporting and suspending the base member within the molten material. In addition, risers may extend upward from the base member for providing a path or channel for the molten materials to exit through.

Although pumps of the foregoing type have been in effective operation for several years, they still suffer from a variety of shortcomings. For example, graphite or ceramic (i.e. refractory materials) are typically the materials used for constructing many of the components of pumps used for processing molten materials because of its low cost, relative inertness to corrosion, and its thermal shock resistance. Although graphite has advantages when used for certain components of molten material pumps, it is not the most advantageous material to be used for complicated shapes and mechanically stressed components.

Various attempts have been made in the past to modify the discharge component of molten metal pumps. For example, in U.S. Pat. No. 5,993,728 discloses the utilization of a convergent nozzle positioned in the outlet passage. Notwithstanding certain advantages provided by this design, the present invention is directed to an alternative approach wherein no restriction of the molten metal is introduced.

Rather, it is preferable to make these types of components, e.g. support posts, risers and rotating shafts, include a metallic material, such as iron based alloys or steel, since metallic materials are considerably stronger per pound than graphite. The problem with using these materials is that the base member and impeller are typically constructed from graphite (due to its wear characteristics) and it is difficult to maintain a connection between metallic and graphite components. Such a difficulty arises because of the differences in thermal expansion experienced by these materials. Accordingly, bolts and conventional fasteners are generally not feasible connecting mechanisms.

Known connections between the support posts and the motor support platform do not allow for easy adjustments to facilitate leveling of the motor support platform. An unleveled motor support platform can cause stress on many of the components of the molten metal pump.

BRIEF DESCRIPTION OF THE FIGURES

FIG. 15 is a schematic view of a pump base in accord with the present invention;

FIG. 16 is a schematic view representing the height dimension of a representative outlet;

FIG. 17 is a schematic view of a representative pump base wherein the outlet diffusing element forms a separate component secured to the base;

FIG. 18 represents a cross section of the pump base of FIG. 17;

FIG. 19 is a perspective view of the outlet diffusing element from an inlet end;

FIG. 20 is a perspective view of the outlet diffusing element from an outlet end;

FIG. 23 is a perspective view of an alternative gas tube plug;

FIG. 24 is a perspective view of a motor mount adjustment mechanism;

FIG. 25 is an exploded perspective view of a motor mount including the adjustment mechanism of FIG. 24; and, FIG. 26 is a side elevation view of a prior art molten metal gas injection pump;

FIG. 27 is a perspective view of an impeller base; and

FIG. 28 is a plan view of the impeller base of FIG. 27.

SUMMARY

Figure 1:
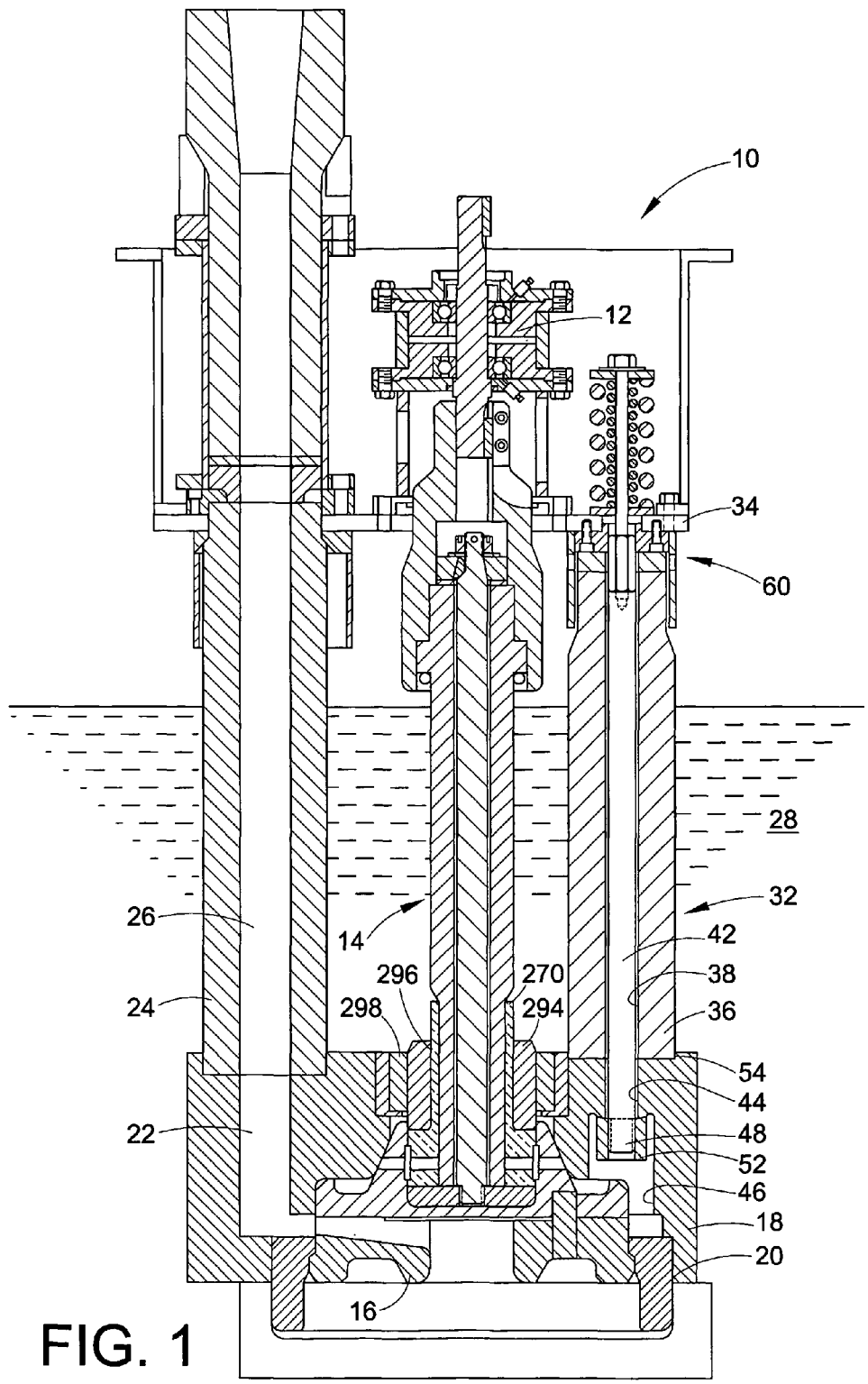
FIG. 1 is a side cross-sectional view of a molten metal pump.

A molten metal pump includes an impeller, a pump base housing at least partially enclosing the impeller, a shaft connected to the impeller, a motor connected to the shaft, a motor mount plate for supporting the motor; and a post for connecting the motor mount plate to the pump base housing. The molten metal pump can include a connector that connects the post to the motor mount plate. The molten metal pump can include a socket for connecting the shaft to the motor. The shaft can comprise an assembly including an elongated metal rod having a first end and a second end and a metal non-circular drive member attached at the second end of the elongated metal rod. The impeller can include a cap member having a plurality of inlet openings communicating with internal passages of the impeller, each inlet opening having an inner wall and an outer wall, the outer wall being longer than the inner wall, each inlet opening also including a leading wall and a trailing wall, the leading wall and the trailing wall each interconnecting the inner wall and the outer wall and each being inclined such that an uppermost edge of each wall precedes a lowermost edge of each wall in a first rotational direction.

The molten metal pump can be used as a gas injection pump. A gas injection tube plug for use with the molten metal pump includes a body having a channel through which gas can flow and a ceramic tip member positioned within the body. A portion of the body is adapted to communicate with a gas injection source for providing gas to the channel. The ceramic tip member includes a passage in communication with the channel.

According to a further embodiment, the molten metal pump can include a fin disposed within the outlet passage. The fin includes a first tapered upstream portion and a second tapered downstream portion, these positions connected by a generally thicker portion wherein the walls of the outlet passage diverge at substantially the same degree of increase as the taper of the first end of the fin, and wherein a gas inject port extends through the fin, exiting the side walls thereof.

According to another aspect of the invention, a molten metal pump having an inlet, an outlet, and a means for drawing molten metal into said inlet and expelling said molten metal from said outlet is provided. The outlet comprises a channel having a first cross-sectional area at an upstream location and a second larger cross-sectional area at a terminal location. More particularly, the channel includes a length L, a height H, and a width W, wherein W generally increases according to an angle $\alpha$ greater than 0 from an upstream location $W_u$ to a terminal location $W_t$. Alternatively, or in addition thereto, the pump has a height H generally increasing according to an angle $\beta$ from an upstream location $H_u$ to a terminal location $H_t$. Preferably, $\alpha$ lies between about 1.5 and 11°, which $\beta$ falls between about 1.0 and 10°. $\alpha$ and $\beta$ can be comprised of an increasing dimension of one wall or the combination of an increasing dimension in opposed walls.

Another aspect of the invention is the understanding of a desired relationship between metal flow in the pump and the dimensions of the diffusing outlet. Q equals metal flow (in$^3$/sec.) and $Q/240 < (W_t \times H_t) < Q/40$. $0.026 < \frac{1}{2}(W_t - W_u) < 0.195$, formula $0.017 < \frac{1}{2}(H_t - H_u)/L < 0.177$.

DETAILED DESCRIPTION

With reference to FIG. 1, a molten metal pump 10 includes a motor 12 that drives an impeller shaft assembly 14 connected to an impeller 16. The pump 10 moves molten metal by rotating the impeller 16 located in a pumping chamber 20 of a pump base housing 18 to move molten metal through an outlet passage 22 in the base housing towards a riser tube 24 having an internal passage 26 through which the molten metal travels. The base housing 18 is positioned inside a molten metal bath 28. Post assemblies 32 space the base housing 18 from a motor mount plate 34 upon which the motor 12 is mounted.

In FIG. 1, the depicted post assembly 32 includes a hollow cylindrical outer protective sheath 36 having a longitudinal throughbore 38 that receives a cylindrical elongated rod 42. The outer protective sheath 36 typically is made from a heat resistant and nonreactive material such as a refractory material including graphite, ceramic, and the like. The elongated rod 42 is typically made from a material having a high tensile strength such as steel, but other suitable materials can also be used.

The pump base housing 18 includes a vertical bore 44 that is dimensioned to receive the elongated rod 42 of the post assembly 32. The elongated rod 42 extends through the vertical bore 44 into a cavity 46. The rod 42 includes a threaded end 48 that cooperates with a nut 52, or other retaining member, to retain the threaded end 48 of the elongated rod 42 inside and to the base housing 18. The nut 52 can have an inclined face that cooperates with an inclined wall in the pump base housing 16 that defines an upper wall of the cavity 46. Aligned with the vertical bore 44, the base housing 18 also includes a circular recess 54 that is dimensioned to receive the outer sheath 36. The outer sheath 36 and the retaining member 52 inhibit molten metal from the molten metal bath 28 from contacting the metal elongated rod 42.

Figure 2:
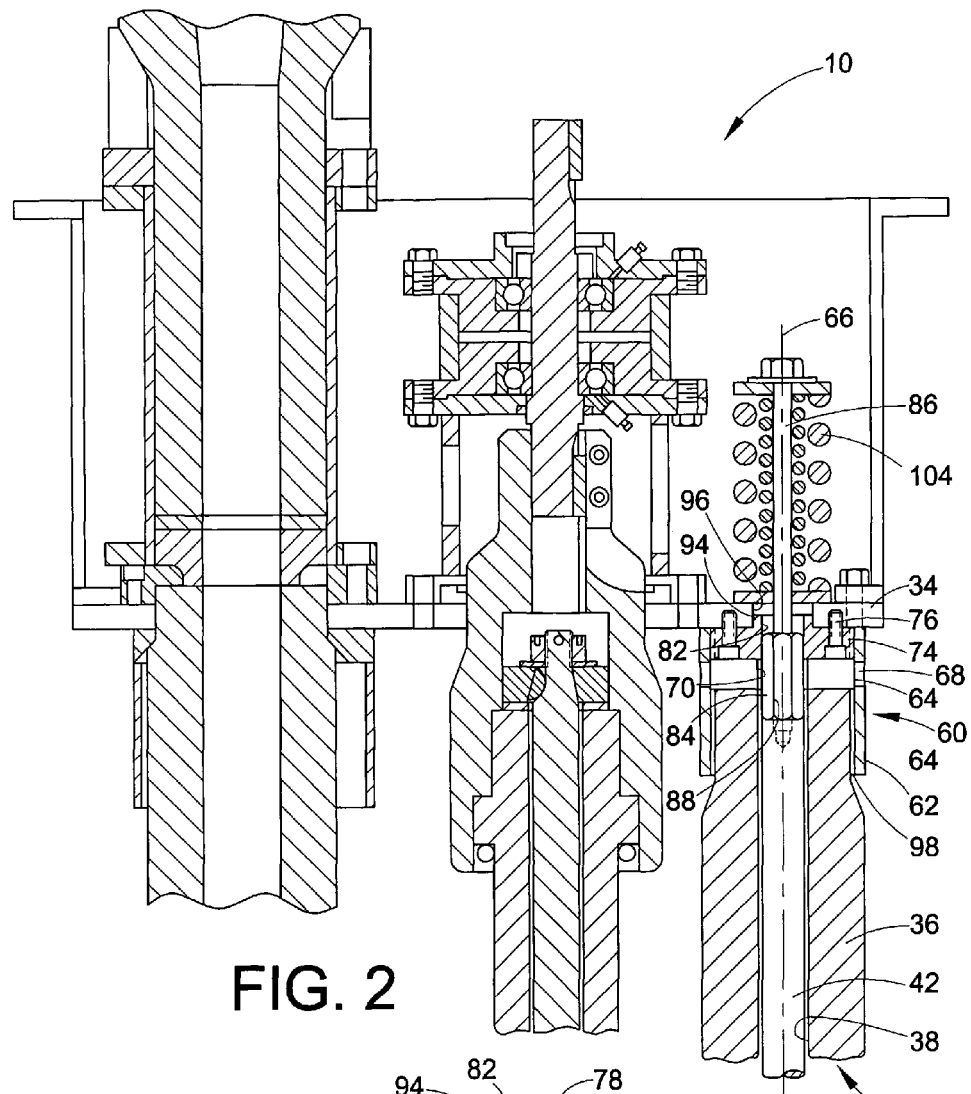
FIG. 2 is a side cross-sectional view of an upper portion of the molten metal pump of FIG. 1 showing the connection between a support post and a motor mount.

Connection between the post assembly 32 and the motor mount plate 34 is provided by a coupling unit 60. With reference to FIG. 2, the coupling unit 60 includes an at least substantially annular wall 62 and an internal wall 64 that extends from the annular wall in a plane that is normal to a central axis 66 of the coupling unit 60 and the elongated rod 42. The annular wall 62 includes openings 68 to allow for attachment of the internal wall 64 to the annular wall. The annular wall 62 and the internal wall 64 can also be made as one integral piece, e.g. cast as one piece, which may obviate the need for the openings 68. The internal wall 64 also includes a central opening 70 aligned with the central axis 66. The internal wall 64 and the annular wall 62 define an upper cavity 72 (FIG. 3) that is configured to cooperate with the motor mount plate 34 and/or a mounting structure, or seat, 74 that attaches to the motor mount plate 34 via fasteners 76.

Figure 3:
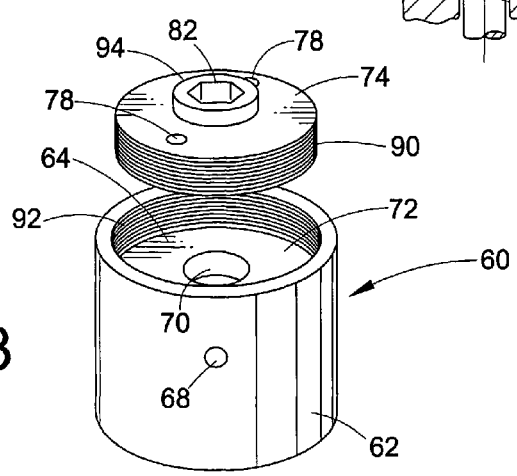
FIG. 3 is a perspective view of a coupling unit and seat for the support post for the molten metal pump of FIG. 1.

As more clearly seen in FIG. 3, the seat 74 includes fastener openings 78 dimensioned to receive the fasteners 76 (FIG. 2) to attach the seat 74 to the motor mount plate 34. The seat 74 can attach to the motor mount plate 34 in other conventional manners, for example welding.

The seat 74 also includes a central opening 82 that is dimensioned to receive the elongated rod 42. The central opening 82 can have a polygonal configuration, which in the embodiment is shown in FIG. 3 is hexagonal, to accommodate a corresponding polygonal-shaped end 84 (FIG. 2) of the elongated rod 42. The central opening 82 and the end 84 of the elongated rod 42 can take other non-circular configurations. The central opening 82 is aligned with the central axis 66. With reference back to FIG. 2, the polygonal opening 82 limits rotation of the polygonal-shaped end 84 of elongated rod 42 as a threaded fastener 86 is screwed into a threaded opening 88 in the end 84 to connect the post assembly 32 to the motor mount plate 34. In an alternative embodiment, the central opening 70 of the internal wall 64 can have a non-circular configuration and the opening 82 in the seat 74 can be circular. The seat 74 also includes an externally threaded sidewall 90 that cooperates with internal threads 92 formed in the upper cavity 72. The threaded connection between the seat 74 and the coupling unit 60 allows for vertical adjustment of the entire post assembly 32. The seat 74 also includes an upper central boss 94 that is received in a correspondingly shaped opening 96 (FIG. 2) in the motor mount plate 34, both of which are aligned with the central axis 66. To attach the shaft assembly 32 to the motor mount plate 34, the coupling unit 60 is screwed onto the mounting seat 74. In an alternative embodiment, the seat can be configured to receive the side wall 62. For example, the seat can be internally threaded and the side wall can be externally threaded.

In addition to the upper cavity 72 described above, the coupling unit 60 defines a lower cavity 98 (FIG. 2) below the internal wall 64 that is configured to receive the outer sheath 36 of the post assembly 32. The outer sheath 36 can include a tapered end that is received inside the lower cavity 98. The outer sheath 36 and the elongated rod 42 are inserted into the lower cavity 98 of the coupling unit 60 and the polygonal-shaped end 84 of the elongated rod 42 extends through the central opening 70 in the internal wall 66 and into the central opening 82 in the seat 74. The fastener 86 is inserted into the threaded central opening 88 in the polygonal-shaped end 84 of the elongated rod 42. The fastener 86 extends through a biasing member 104, for example Bellville springs having washers disposed at opposite ends, and is screwed into the threaded opening 88 of the elongated rod 42. The biasing member 104 places the rod 42 in tension which compresses the outer sheath 36.

The coupling unit 60 provides for an easier connection between the shaft assembly 32 and the motor mount plate 34, as compared to known devices. The coupling between the shaft assembly 32 and the motor mount plate 34 has fewer parts than known coupling assemblies. Where a plurality of posts are provided in a molten metal pump, the coupling unit 60 provides for a self leveling configuration by providing the seat 74 to which the coupling unit can adjustably connect. Also, the dimensions of the outer sheath 36 are not as critical as known devices because of the adjustable, e.g. threaded, connection between the coupling unit 60 and the seat 74.

Figure 4:
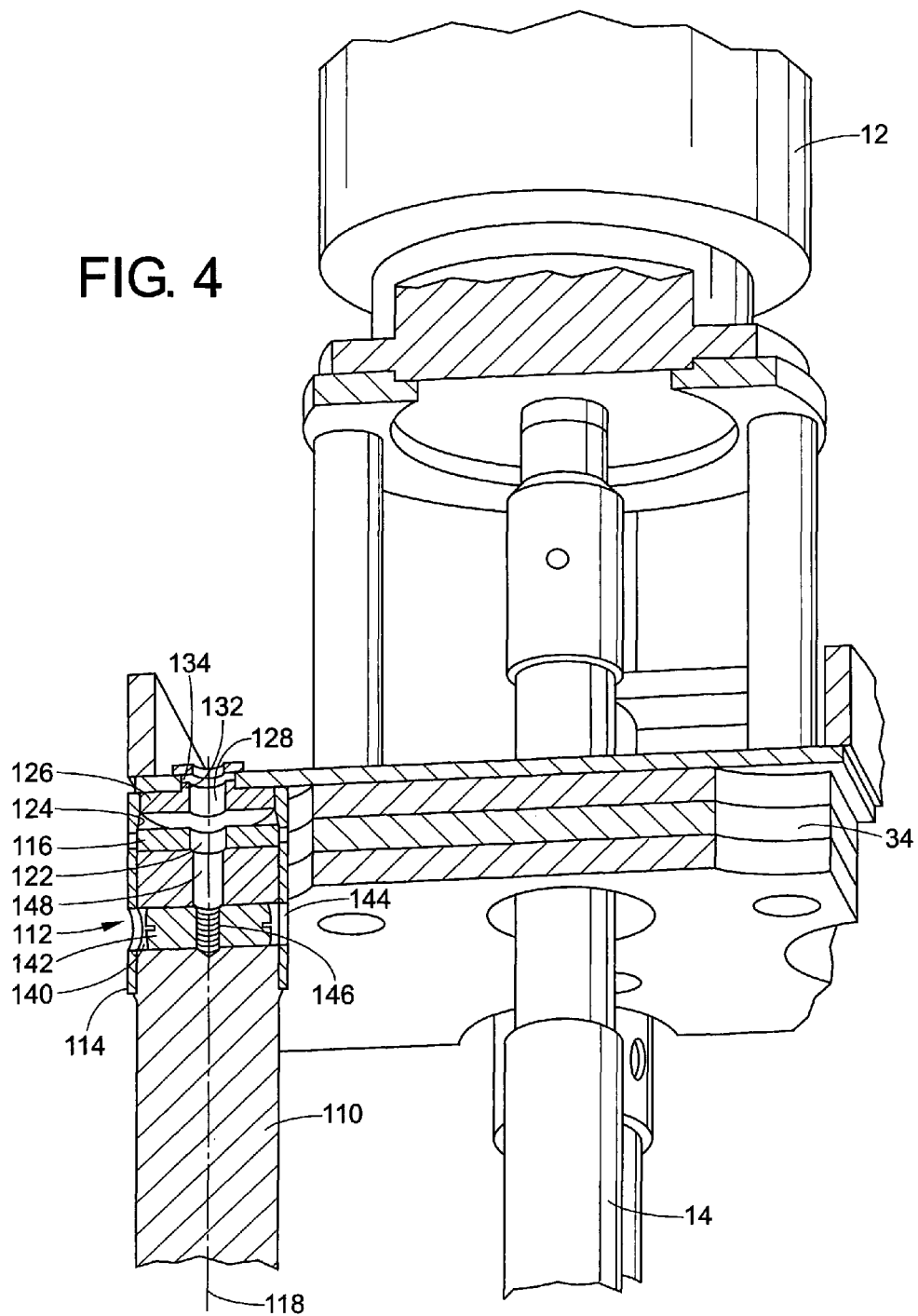
FIG. 4 is a cross-sectional view of a portion of a molten metal pump showing another embodiment of a support post and coupling unit.

With reference to FIG. 4, an alternative coupling arrangement between a graphite post and the motor mount plate 34 is disclosed. In this embodiment, a coupling unit 112 is similarly configured to the coupling unit 60 disclosed in FIG. 2. The coupling unit 112 includes an annular wall 114 and an internal wall 116 that is attached to the annular wall 114 and resides in a plane that is at least substantially normal to a central axis 118 of the post 110 and the coupling unit 112. The internal wall 116 includes a central opening 122 dimensioned to receive a fastener (not shown) similar to the fastener 86 depicted in FIG. 2. The annular wall 114 and the internal wall 116 define an upper cavity 124 that is configured to cooperate with the motor mount plane 34 and/or a seat 126. The seat 126 can attach to the motor mount plate 34 in a similar manner as the seat 74 described in FIG. 2. The seat includes a central opening 128 that is dimensioned to receive a fastener (not shown). The seat 126 also includes a pilot boss 132 that is received inside an opening 134 in the motor mount plate 34. The annular wall 114 is threaded onto the seat 126 in a similar manner to that described in FIG. 2.

The graphite post 110 includes a horizontal bore 140 that extends through the post in a direction perpendicular to the central axis 118. The bore 140 is configured to receive a barrel nut 142. The annular wall 114 of the coupling unit 112 includes aligned openings 144 that are also configured for receipt of the barrel nut 142. The barrel nut 142 includes a vertical threaded tap hole 146 that aligns with the central axis 118 when the barrel nut 142 is properly positioned inside the bore 140. The post 110 also includes a vertical bore 148 that is aligned with the central axis 118 and extends from an upper end of the post 110 into the cross bore 140.

A fastener (not shown) similar to the fastener 86 disclosed in FIG. 2, is inserted into the central opening 128 of the seat 126, the central opening 122 of the internal wall 116, the vertical bore 148 of the post 110 and the threaded tap hole 146 of the barrel nut 140. The fastener 86 can cooperate with a biasing member similar to that shown in FIG. 2. The fastener is tightened drawing the barrel nut 140 upward which provides a compressive force on the post 110 and can put the fastener in tension. Components from the coupling assembly described in FIG. 4 can also be used with the coupling assembly described in FIGS. 2 and 3.

Figure 5:
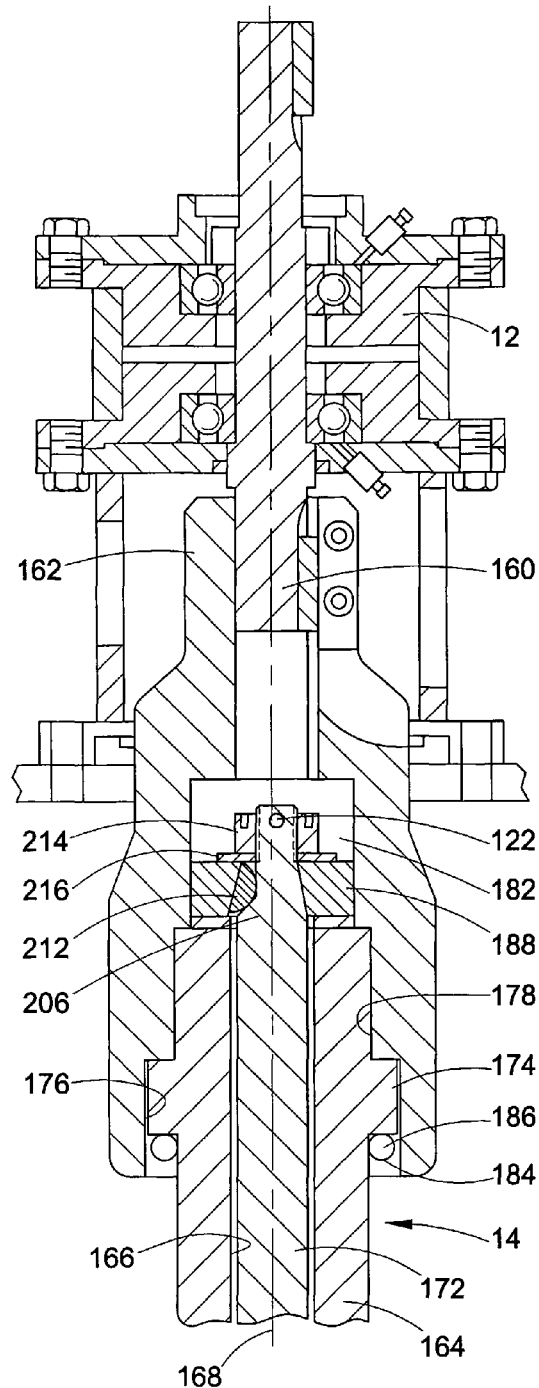
FIG. 5 is a cross-sectional view taken from FIG. 1 showing the connection between an impeller shaft and a motor for the molten metal pump of FIG. 1.

With reference to FIG. 5, the connection between the motor 12 and the impeller shaft assembly 14 is disclosed. A drive shaft 160 extends from the motor 12 and connects to a socket 162 that receives the impeller shaft assembly 14. The impeller shaft assembly 14 includes a generally cylindrical hollow outer sleeve 164 that is made from a refractory material such as graphite, ceramic, or the like. The outer sleeve 164 includes a vertical central throughbore 166 that is aligned with a central axis 168 of the shaft assembly 14. The central bore 166 receives an elongated rod 172 that is made from a heat resistant metal, such as a heat resistant steel that is known in the art.

The outer sleeve 164 includes a radial shoulder 174 located near an upper end of the outer sleeve. The socket 162 includes a stepped cavity that defines a lower cavity 176, a central cavity 178, and an upper cavity 182. The lower cavity 176 is appropriately dimensioned to receive the shoulder 174 of the outer sleeve 164. The socket 162 includes openings 184 that receive pins 186 that are disposed just below the shoulder 174 of the outer sleeve 164 when the shaft assembly 14 is inserted into the socket's cavity. The pins 186 can vertically retain the shaft assembly 14 inside the socket 162. The central cavity 178 is dimensioned to receive an upper portion of the outer sleeve 164 that is disposed above the shoulder 174. The upper cavity 182 of the socket 162 is appropriately dimensioned to matingly receive a shaft connector 188, which is described in more detail below.

Figure 6:
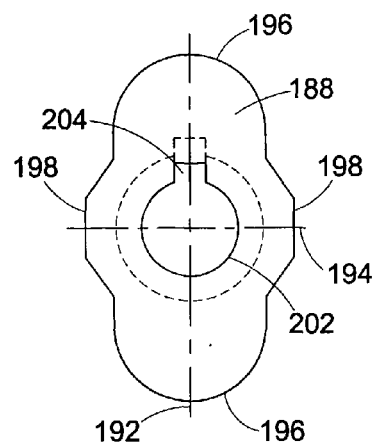
FIG. 6 is a plan view of a shaft connector for the molten metal pump of FIG. 1.
Figure 7:
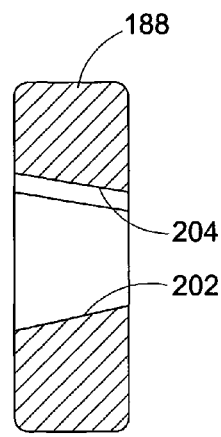
FIG. 7 is a side cross-sectional view of the shaft connector shown in FIG. 6.

With reference to FIGS. 6 and 7, the shaft connector 188 is made from a heat resistant steel. The periphery of the upper cavity 182 of the socket 162 (FIG. 5), which is not circular, is shaped to match the periphery of the shaft connector 188. Thus when the shaft connector 188 is connected to the elongated rod 172 (FIG. 5) and received inside the complementary shaped upper cavity 182 of the socket 162, rotation of the socket 162 results in rotation of the elongated rod 172.

In the embodiment depicted in FIGS. 6 and 7, the shaft connector 188 is symmetrical in both a first, or major, axis 192 and a second, or minor, axis 194. The major axis 192 and the minor axis 194 are both perpendicular to one another and perpendicular to the central axis 168 (FIG. 5). The shaft connector 188 includes opposing circular longitudinal ends 196 and opposing lateral sides 198 that interconnect the longitudinal ends 196. The shaft connector 188 includes a keyed conical opening 202 that includes a keyway 204 extending into the shaft connector 188 from the conical opening 202.

Figure 8:
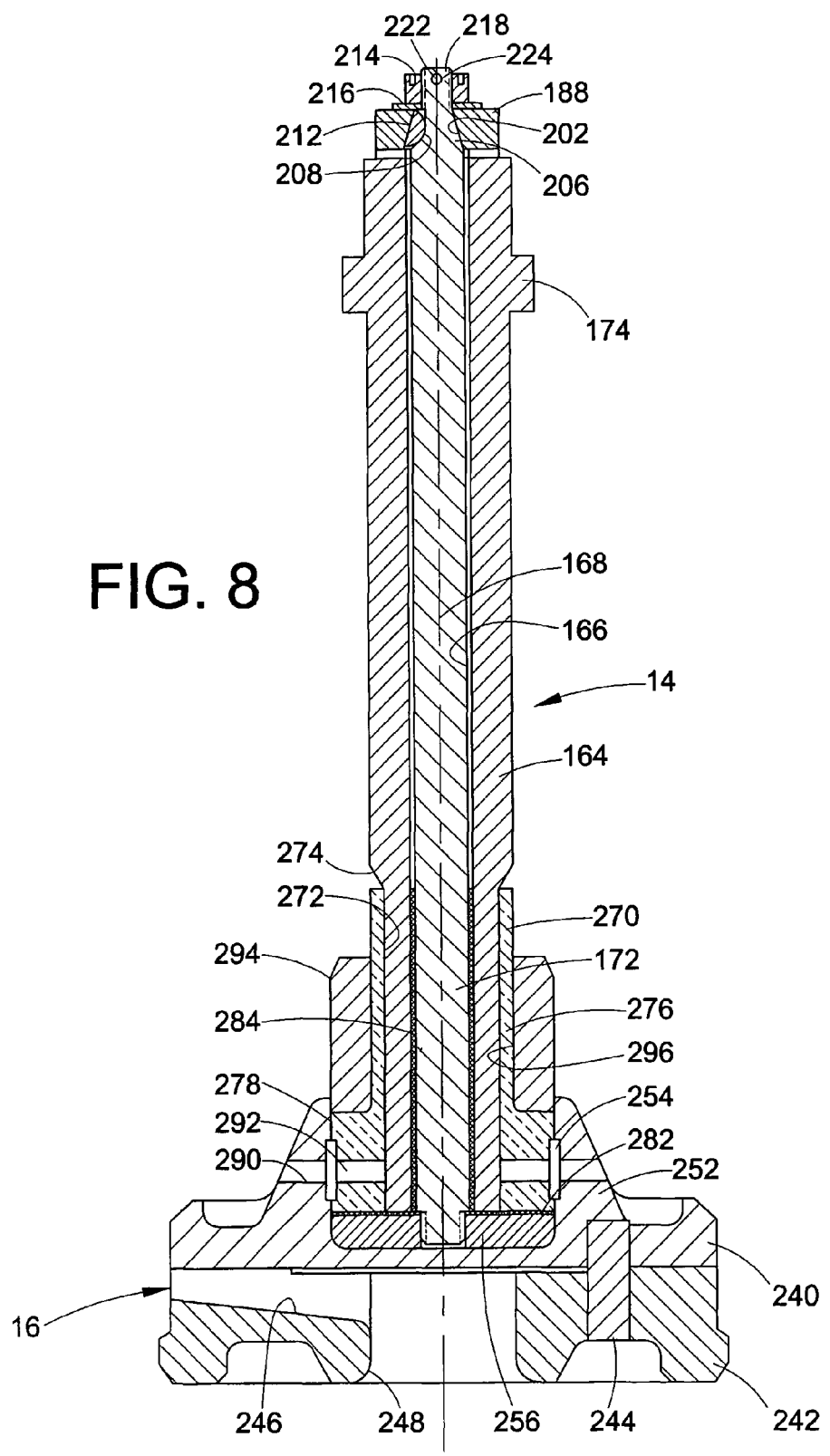
FIG. 8 is a side cross-sectional view of an impeller and shaft assembly of the molten metal pump of FIG. 1.

With reference to FIG. 8, the elongated rod 172 includes a conically tapered portion 206 that is received inside the central opening 202 of the shaft connector 188. The tapered portion 206 is shaped to matingly conform with the central opening 202 of the shaft connector 188. The tapered portion 206 includes a keyway 208 cut vertically into the outer surface of the tapered portion 206 that aligns with the keyway 204 of the shaft connector 188. The keyways 204 and 208 receive a key 212 to lock the shaft connector 188 to the elongated rod 172. The shaft connector 188 provides a metal-to-metal connector between the socket 162 and the elongated rod 172 thus providing a strong connection between the motor shaft 160 and the impeller shaft assembly 14. A nut 214 and washer 216 can attach to an upper threaded end 218 of the elongated rod 172 to secure the key 212 vertically in place. A cotter pin 222 is received in a transverse throughbore adjacent the upper end of the elongated rod 172.

With reference to FIG. 8, a lower end of the impeller shaft assembly 14 attaches to the impeller 16. The impeller 16 includes a top structure 240 that attaches to a lower structure 242 using a key 244. The top structure 240 and the bottom structure 242 define vanes 246 through which the molten metal is pumped. The bottom structure 242 also includes an inlet 248 where molten metal enters the impeller. The impeller 16 depicted is a bottom inlet impeller; however, the impeller can take other configurations, such as a top inlet impeller.

Figure 9:
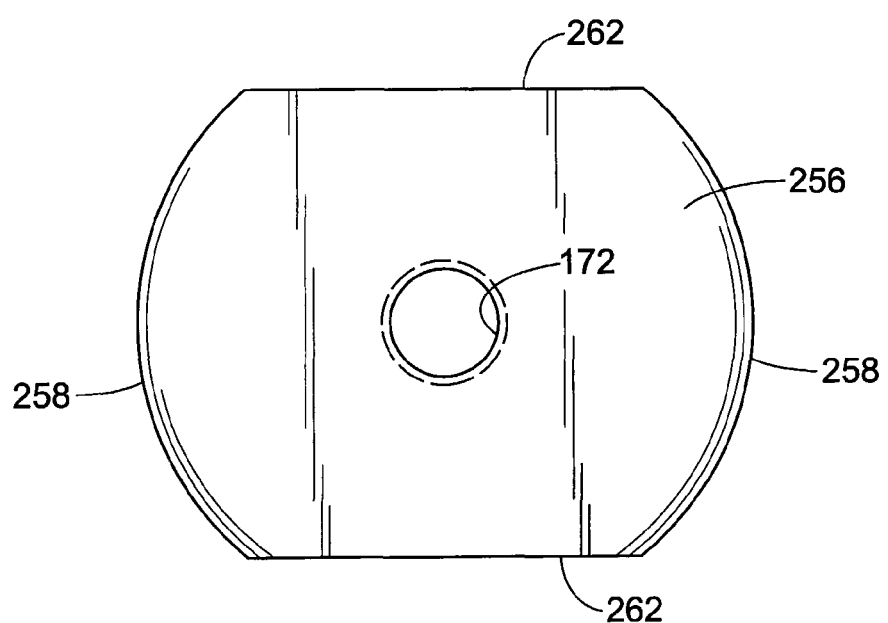
FIG. 9 is a bottom plan view of the shaft assembly of the molten metal pump of FIG. 1.

The top structure 240 of the impeller 16 includes an upwardly extending hollow boss 252 that defines a cavity 254 that receives the lower end of the shaft assembly 14. An obround plate 256 attaches to a lower end of the elongated rod 172. As more clearly seen in FIG. 9, which is a bottom plan view of the shaft assembly 14, the plate 256 includes opposing rounded longitudinal edges 258 and flattened lateral edges 262. The cavity 254 of the impeller 16 is appropriately shaped to match the periphery of the lower plate 256 so that rotation of the elongated rod 172 results in rotation of the impeller 16.

Figure 10:
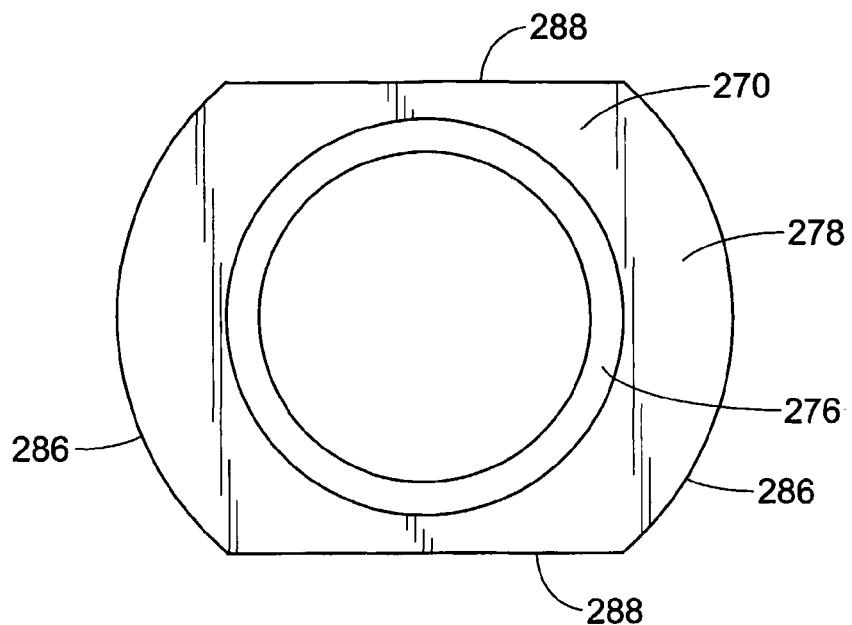
FIG. 10 is a top plan view of a boot of the shaft assembly of the molten metal pump of FIG. 1.

With reference back to FIG. 8, a hollow boot 270 having a vertical throughbore 272 receives a lower end of the outer shield 164. The outer shield 164 includes a tapered portion 274 that transitions into a lower portion that is received inside the boot 270. As more clearly seen in FIG. 10, which is a top plan view of the boot 270, the boot includes an annular upper portion 276 that extends upwardly from a lower obround portion 278 that matches the configuration of the lower plate 256. Accordingly, the obround base 278 of the boot 270 includes rounded longitudinal ends 286 and flattened lateral ends 288. The boot 270 is made from a refractory material such as graphite, ceramic, or other similar material. With reference back to FIG. 8, filler material 282 is interposed between a lower surface of the base 278 of the boot 270 and an upper surface of the lower plate 256. Likewise, the filler material 284 is interposed between the elongated rod 172 and the outer sleeve 164. The filler material can comprise granular graphite and other heat resistant materials.

The configuration of the boot 270 provides a large bearing surface (i.e., flattened surfaces 288), to engage cooperating surfaces of the cavity 254 of the impeller 16 so that the impeller 16 can rotate along with the shaft assembly 14. Horizontal throughbores 290 are provided in the upper structure 240 of the impeller 16 and align with horizontal throughbores 292 in the boot 270. Cement can be injected through the bores 290 and 292 to further attach the boot 270 to the impeller 16.

With reference back to FIG. 1, the impeller 16 is housed the pumping chamber 20 defined in the pump base housing 18. An annular bearing ring 294 having a central bore 296 receives the boot 270. The bearing ring 294 bears against a stationary bearing ring 298 that is attached to the pump base housing 18.

Figure 11:
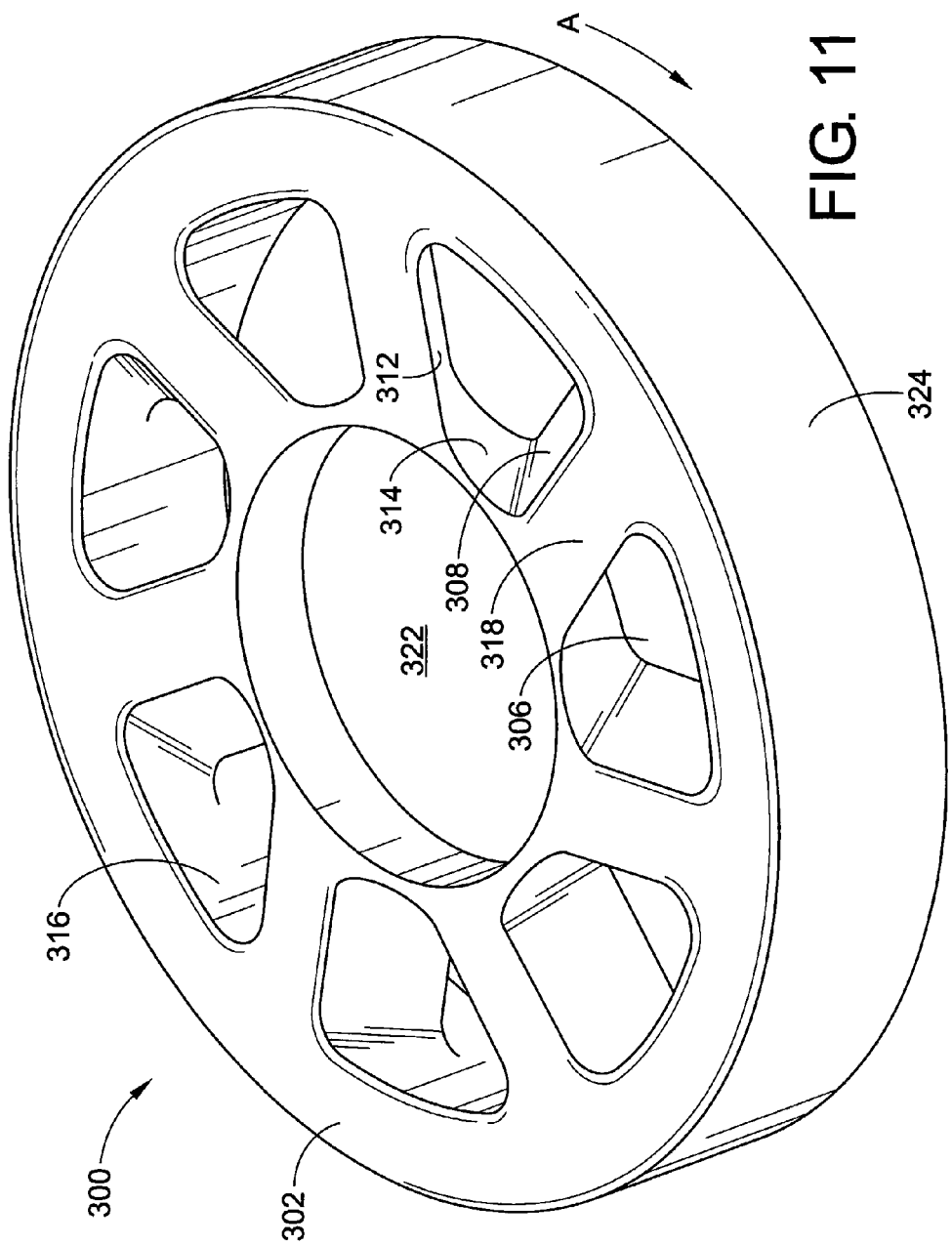
FIG. 11 is a top perspective view of a cap member for use with an impeller of a molten metal pump, such as the pump depicted in FIG. 1.

With reference to FIG. 11, a cap member 300 for a top inlet impeller that can attach to the impeller shaft assembly 14 is shown. The cap member 300 can also attach at the bottom of an impeller to form a bottom inlet impeller. Vanes, similar to vanes 246 (FIG. 8) are provided in both of the aforementioned impellers so that the impeller can move molten metal. The cap member 300 disclosed in FIGS. 11 and 12 increases the quantity of molten metal that can be pumped in a particular amount of time, as compared to known impellers. The member 300 will be described as a cap member, however, it is understood that the member can attach to either the top or bottom of an impeller.

Figure 12:
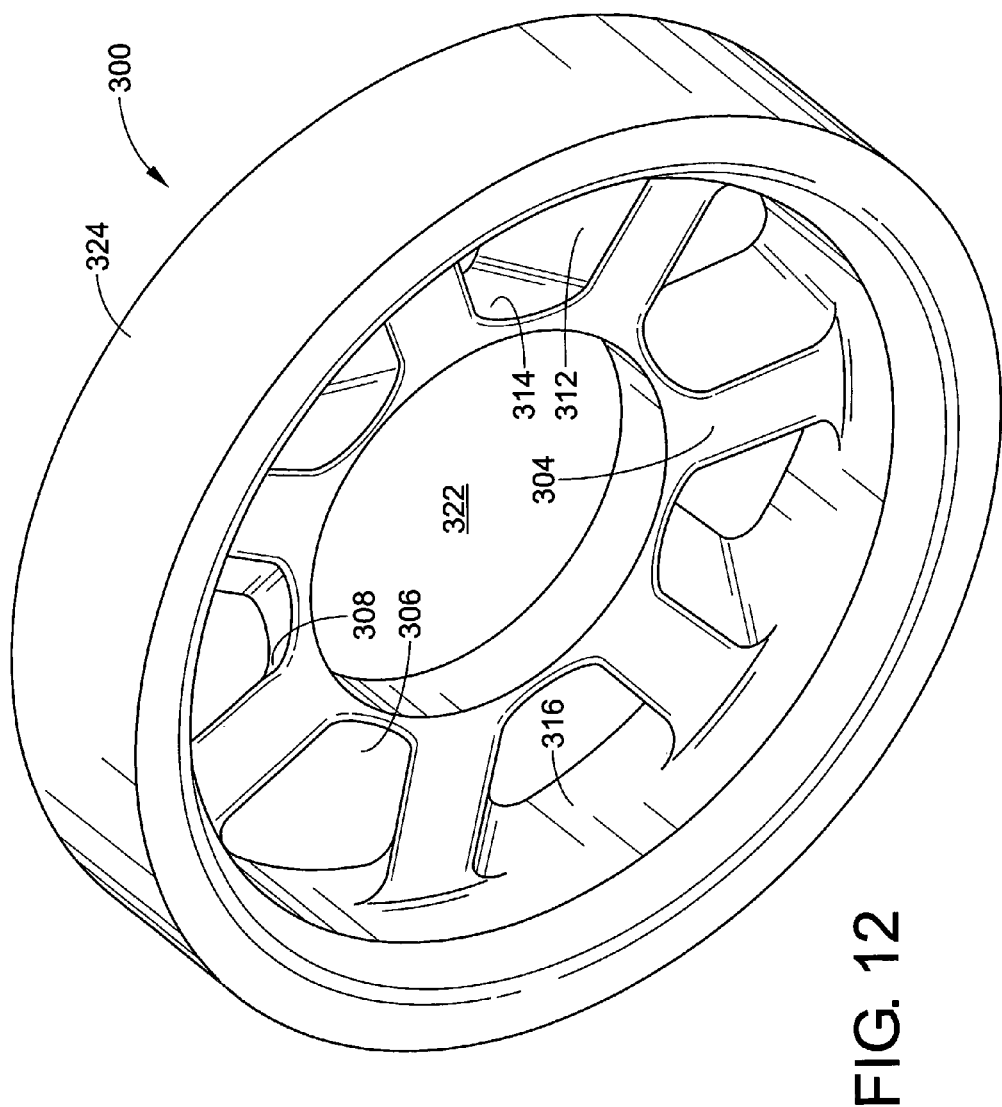
FIG. 12 is a bottom perspective view of the cap member of FIG. 11.
Figure 13:
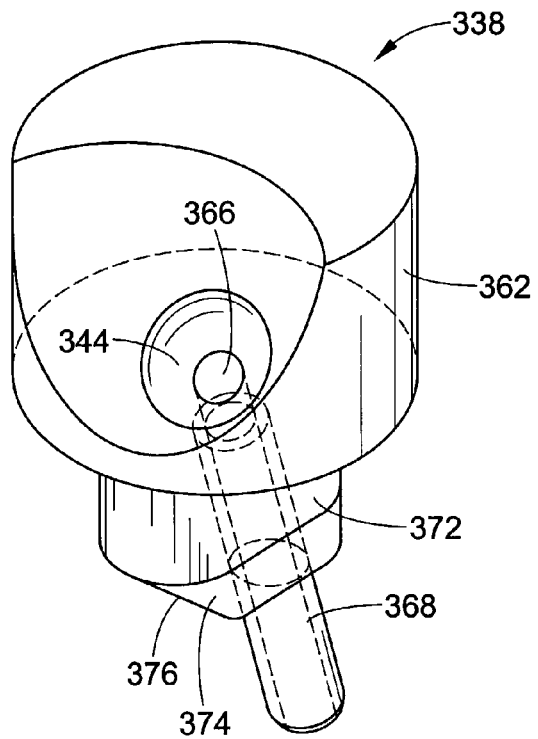
FIG. 13 is a perspective view of a gas tube plug for use with a gas injection molten metal pump.

With reference again to FIG. 11, the cap member 300 includes an upper surface 302 and a lower surface 304 (FIG. 12). A plurality of inlet openings 306 are formed through the cap member 300. Each inlet opening 306 will communicate with internal passages of an impeller, such as passages 246 in FIG. 8. The cap member 300, in this embodiment, is meant to rotate in a clockwise direction as shown by arrow A. Each inlet opening 306 is defined by a leading radial wall 308, a trailing radial wall 312, an inner circumferential wall 314, and an outer circumferential wall 316. The inner and outer walls 314 and 316 interconnect the leading and trailing walls 308 and 312. The inner circumferential walls 314 and the outer circumferential walls 316 can be generally concentric with a central rotational axis of the face 300. The intersection between adjacent walls results in rounded corners.

The leading radial wall 308 and the trailing radial wall 312 are inclined as compared to the rotational axis of the face 300 such that molten metal travels downward along the planar leading and trailing walls into the impeller. In other words, an uppermost edge of each leading wall 308 and each trailing wall 312 precedes a lowermost edge of each leading wall 308 and each trailing wall 312 as the impeller rotates in the clockwise direction. The angle of inclination is about _____ to about _____ degrees for each of the walls. The walls can be parallel to one another; however, in other embodiments the walls can be situated other than parallel to one another. The inclined walls encourage more molten metal to enter the impeller passages as compared to vertically oriented inlet walls. Furthermore, the generally concentric inner wall 314 and outer wall 316 provide a larger inlet opening as compared to circular inlet or rectangular inlet openings in that only inclined bar-like spokes 318 that are defined by the inlet openings 306 interrupt the flow of molten metal into the impeller. Even in an embodiment where the inner wall 314 and the outer wall 316 are linear, the opening has a generally trapezoidal shape to provide a larger opening. Accordingly, more inlet opening surface area is provided to receive more molten metal.

The cap member 300 includes a central opening 322 to accommodate an impeller shaft, such as the impeller shaft assembly 14 of FIG. 1. Even though the central opening is depicted as circular, it can be shaped to accommodate a non-circular portion of the impeller shaft assembly 14. In the embodiment depicted in FIGS. 11 and 12, the cap member 300 also includes a peripheral wall 324 that depends away from the lower surface 304 of the cap member. The peripheral wall 324 can attach to a lower portion of an impeller, such as the bottom structure 242 depicted in FIG. 1.

The molten metal pump depicted in FIG. 1 is referred to as a transfer pump since molten metal is transferred to another location through the passage 26 in the riser tube 24. The molten metal pump can be used in other environments as a gas injection pump where the outlet 22 and the base 18 would be substantially horizontally disposed to communicate with a discharge device 330 depicted in FIG. 14.

The cap member 300 can also attach to a base member 900, which is depicted in FIGS. 27 and 28. The base member 900 includes a central opening 902 formed in a raised central boss 904. The central opening 902 aligns with the central opening 322 of the cap member 300 to accommodate the impeller shaft assembly 14 (FIG. 1). A plurality of radial walls 906, or impeller blades, extend radially from the central boss 904. Each radial wall 906 includes a notch 908 formed in an upper outer end of the radial wall. The notch 908 accommodates the peripheral wall 324 of the cap member 300 (FIG. 12).

Each radial wall 906 includes a first surface 912 and a second surface 914. When the base member 900 rotates in a clockwise direction, the first surface 912 can be referred to as a leading surface and the second surface 914 can be referred to as a trailing surface. When the base member 900 rotates in a counterclockwise direction, the first surface 912 can be referred to as a trailing surface and the second surface 914 can be referred to as a leading surface. The first and second surfaces define an outlet passage 916, which in the depicted embodiment is generally horizontal.

In the depicted embodiment, each radial wall 906 includes a chamfered peripheral end 918 that extends towards into the outlet passage 916. Accordingly, the first surface 912 is angled at its peripheral edge toward the second surface 914 of an adjacent radial wall 906 that defines the outlet passage 916 defined by the subject first surface and the subject second surface. The chamfered peripheral end 918 acts as a sort of exit inducer and can further increase the velocity of the molten metal that passes through the impeller.

The cap member 300 attaches to the base member 900 such that the spokes 318 of the cap member align with the radial walls 906 of the base member. The cap member 300 can be cemented to the base member 900. The entire impeller can have a height of about seven inches, which is less than known impellers. If desired, a bearing ring (not shown in FIGS. 27 and 28) can attach to a lower portion of the base member 900.

For a gas injection pump, molten metal is pumped through an outlet passage 332 formed in the discharge device 330 that is in communication with the pumping chamber 20 (FIG. 1). Gas such as chlorine is introduced into the discharge passage 332 through a passage 334 formed in a gas injection tube 336. A tube plug 338 mounts to the discharge device 330 inside an opening 342. The tube plug includes a contoured opening 344 that receives a lower end of the gas discharge tube 336 to allow communication between the passage 334 in the gas discharge tube 336 and the discharge outlet passage 332.

In known devices that pump molten aluminum, magnesium chloride tends to buildup near the location where the chlorine is introduced in the discharge stream, e.g. the molten metal stream passing through the discharge passage 332. The buildup of magnesium chloride can result in great difficulty in removing the discharge tube from the tube plug. A great enough flow of molten metal through the discharge passage 332 results in a vacuum being created where the chlorine is introduced into the discharge stream. Accordingly, the buildup of magnesium chloride can be greatly reduced or eliminated. By using the cap member 300 (FIGS. 11 and 12) on an impeller of a pump, the flow through the discharge passage 332 can be greatly increased, as compared to known impellers operating at the same RPM.

Where great enough flow is achieved, the gas injection tube 334 can be received inside the opening 344 formed in the tube plug 338 without the need of cement to secure the tube 336 to the plug 338. The gas injection tube 336 includes a tapered end 358 that has a complementary shape to the conically shaped opening 344 in the plug 338. The plug 338 includes a slanted opening 366. A ceramic tube is received inside and extends from the opening 366.

Figure 14:
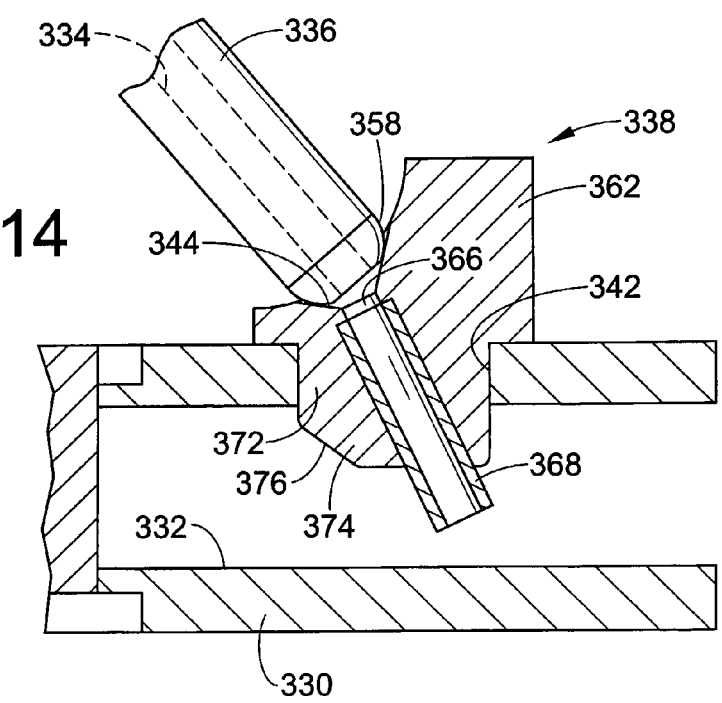
FIG. 14 is a side perspective view of the gas injection tube in a pump outlet.
Figure 21:
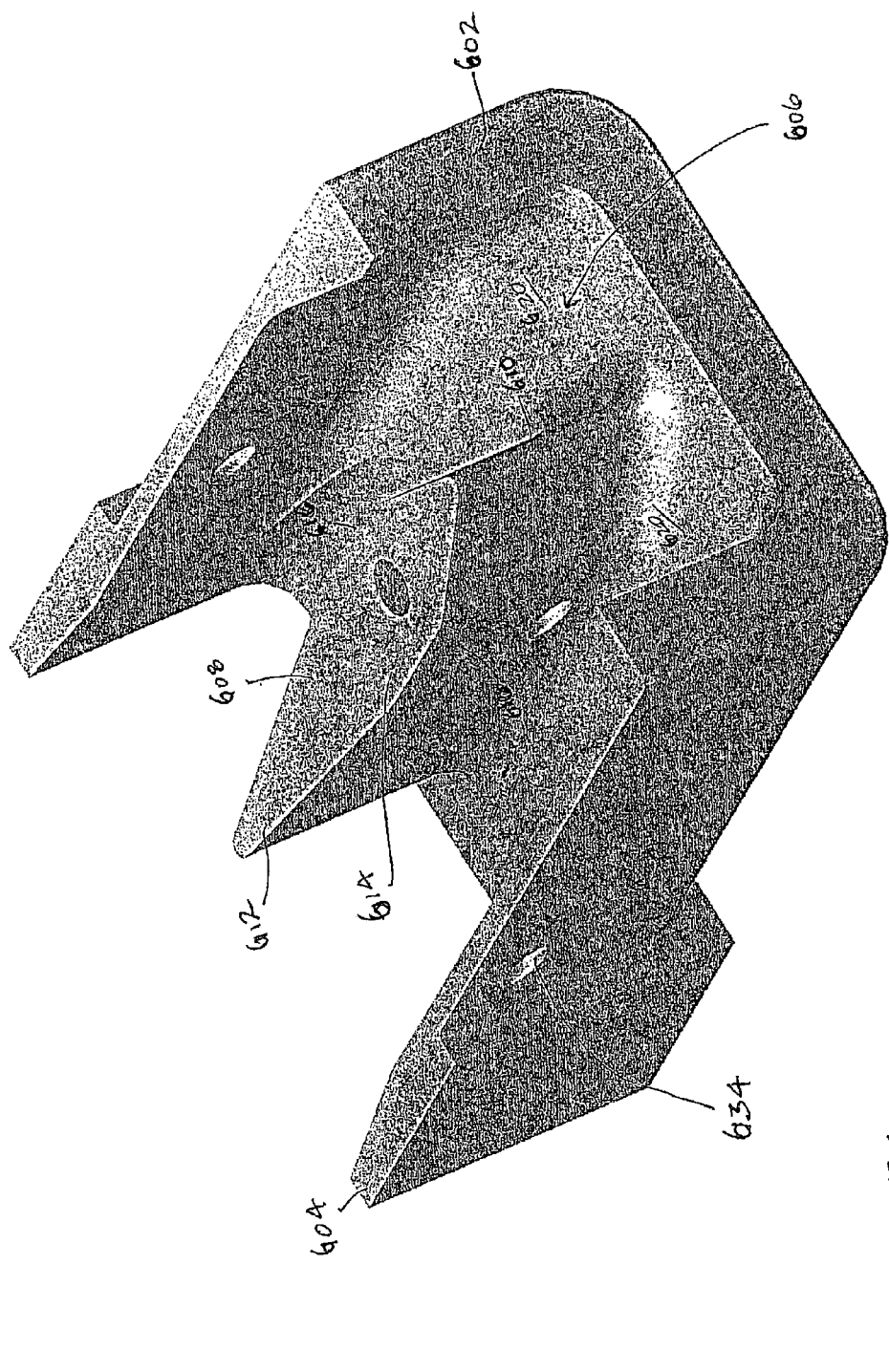
FIG. 21 is a perspective cross-sectional view of the outlet diffusing element.
Figure 22:
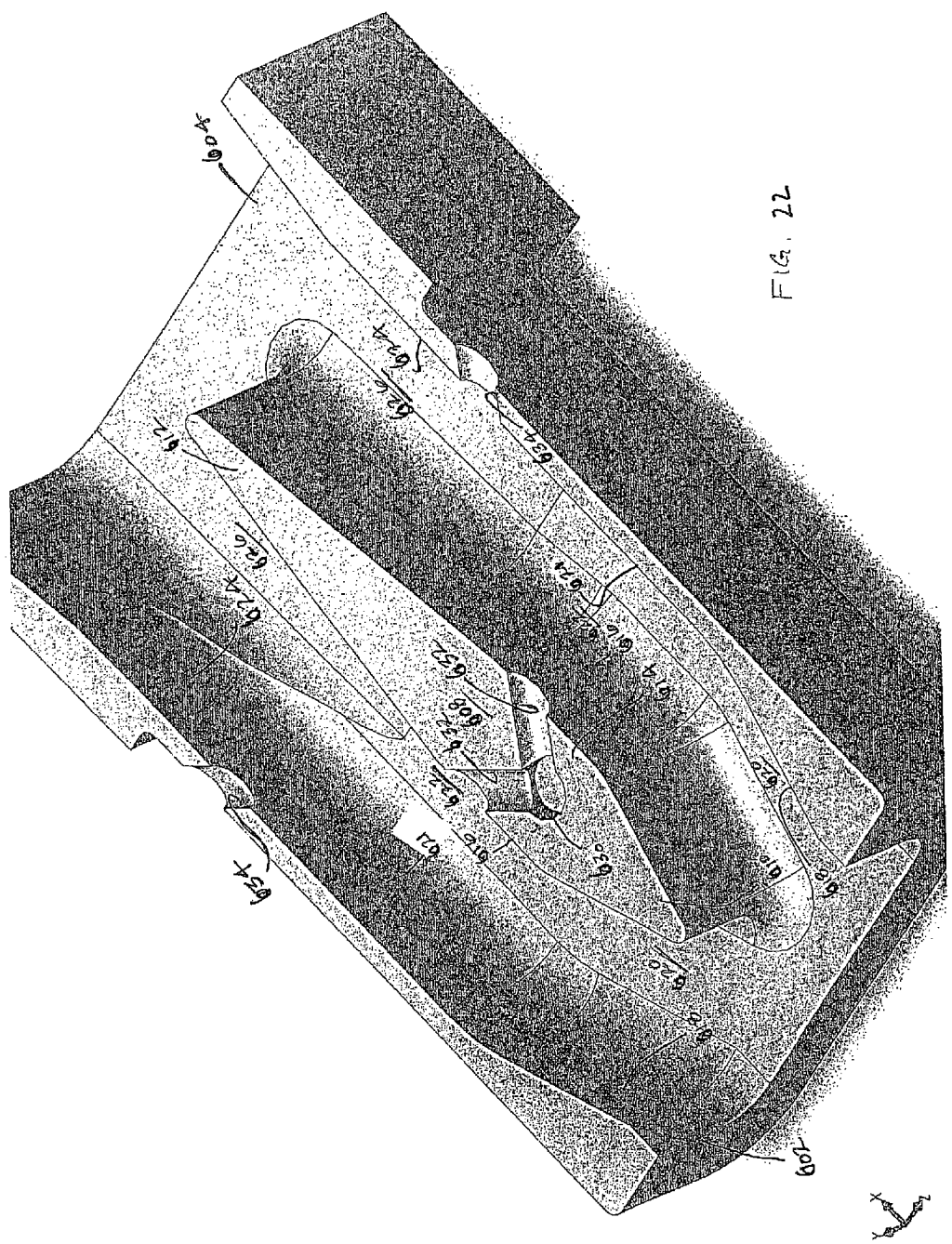
FIG. 22 is a perspective deep cross-sectional view of the inlet diffusing element.

The tube plug 338 includes a generally elliptically shaped intermediate portion 372 extending from a cylindrical portion 362. The intermediate portion 372 transitions into a distal fin 374 having a tapered edge 376. The elliptically shaped portion 372 and fin 374 can extend into the discharge opening 332 of the gas discharge device 330. The flow of molten metal can be in the direction from the vertical end of the fin 374 towards the tapered edge 376, or vice versa, which is shown in FIG. 14. The ceramic tip member 368 can extend into the molten metal stream flowing through the discharge opening 332. The depth that the ceramic tip member 368 extends into the molten stream can vary from the top of the molten metal stream to near the bottom of the molten metal stream. In one alternative design, it is feasible that the entire fin element 374 or even the entire tube plug 338 be comprised of ceramic.

Having the ceramic tip 368 extend into the molten metal stream extends the life of the system, as compared to known systems that use only graphite to make the components of the gas injection system. The ceramic tip 368 can extend into the molten metal stream so that gas that is injected into the stream is injected at a lower portion of the stream.

In contrast to known gas injection systems, the gas injection tube 336 can be seated in the opening 344 of the tube plug 338 without cementing the tube to the plug, where the flow of molten metal through the discharge outlet 332 is such that an adequate vacuum is created. The shape of the fin 374 and the intermediate elliptical region 372 is such that the flow of molten metal is not greatly hindered. The shape of the discharge passage can also be made to minimize the flow-hindering effect of the tube plug 364, for example by widening the discharge passage in the area that is adjacent the tube plug 338.

Referring now to FIG. 26, a typical gas injection pump 400 is depicted. Particularly, the pump 400 includes a hanger assembly 402 used for lifting and positioning of the pump as necessary within a furnace (not shown). A motor 403 is supported by a motor mount 404, itself supported by a support plate 406. The motor 403 is connected via a coupling assembly 408 to a rotatable shaft 410 secured to an impeller 412.

A base assembly 414 rests on the floor of a refractory furnace and forms a foundation for the support plate 406 and motor mount 404 by a plurality of posts 416. The impeller 412 is rotatable within a pumping chamber 418 and its rotation draws molten metal 419 into the pumping chamber 418 through an inlet 420 and discharges the molten metal through an outlet passage 422.

A reactive gas is provided to a gas injection tube 424 supported by a clamping mechanism 426 attached to the support plate 406. The submerged end of the gas injection tube 424 is connected via a tube plug 428 to the outlet passage 422. Adjacent the discharge opening 430 of the outlet passage 422 is a convergent nozzle 425. Particularly, the outlet "necks down" to form an area of restriction 432 (a "zone of convergence") injection point. Unfortunately, this design increases velocity of the metal at the outlet and restricts flow resulting in increased impact with the relatively stationary molten metal in the charge well.

In contrast to this design, the present invention includes a divergent fan type of outlet. Otherwise, the pumps can be similar. Accordingly, U.S. Pat. No. 5,993,728 is herein incorporated by reference.

Referring now to FIG. 15, a centrifugal molten metal pump base 560 is depicted. Within base 560, a volute pumping chamber 562 which houses an impeller 564 is provided. Upon rotation of impeller 564, molten metal enters the impeller inlet 566 through the pump base 560 inlet (not shown) and exits into volute chamber 562 via multiple passages 568. Accordingly, molten metal is forcibly expelled from the volute chamber 562 into outlet passage 570. Outlet passage 570 includes a gas injection inlet 572 and a fan diffusing section 574. Preferably, the gas injection inlet 572 is positioned downstream of line 576 which is positioned generally perpendicular to the volute cut water and upstream of the fan diffusing section 574. The pump impeller 564 has a radial wall which lies generally tangential to an imaginary line extended from the near wall 578 of the outlet passage 570.

Fan diffusing section 574 can be characterized by an upstream width ($W_u$) and a terminal width ($W_T$). $W_T$ exceeds that of $W_u$ as a result of the diverging nature of the side walls in the width direction. In this instance, the increase in width is shown by an increasing dimension of the angle α of each wall. However, the increase does not necessarily occur in each wall but could be expressed in a single wall. This arrangement is shown particularly in FIG. 16 wherein the height aspect of fan diffusing section 574 is depicted. More particularly, fan diffusing section 574 increases in its height according to angle β providing a greater terminal height dimension $H_T$ than an upstream height dimension $H_u$.

Referring now to FIG. 17, the invention design is shown in an alternative form, wherein the fan diffusing section 580 comprises a separate component from base 582. Fan diffusing section 580 can be attached to base 582 by any means available to the skilled artisan, including a dowel/cement combination 584, a threaded connection, cement alone, or any other suitable technique.

Referring now to FIG. 18, the use of an alternative gas injection system is depicted wherein gas injection inlets 590 are dispersed to each wall of the outlet passage 592. The gas injection inlet 590 can feed via separate gas lines or via a single gas line in combination with a splitting mechanism. In any event, this design is believed to aid gas dispersion.

The present invention has been found to reduce outlet flow pressure pulsations resulting in a similar reduction in pump base fractures. Furthermore, it has been determined that an increase in molten metal penetration into the charge well is established. As a skilled artisan will recognize, the primary significance of utilizing a molten metal pump for circulation is to provide the desired BTU units in the form of molten metal from the furnace to the charge well. If molten metal penetration into the charge well is too low, insufficient energy is provided for the melting of scrap charge therein. If molten metal velocity into the charge well is too high, undesirable disruption of the charge well molten metal surface results in undesirable oxidation. More particularly, the pump metal would diffuse outwardly at an angle equal to 2α increasing the charge wells swept area. In short, the introduced metal wets a more significant area of the charge well.

In addition, by increasing the molten metal outlet pressure, deeper and smoother penetration into the stationary metal pool of the charge well results. Historically, the introduction of a high velocity metal flow from the outlet to a stationary charge well pool results in significant impact vibration often causing cracking of the molten metal pump components, particularly the base. By reducing the flow velocity and increasing flow pressure utilizing the fan diffusing outlet, impact vibrations are reduced. Advantageously, this also allows the pump to operate at higher rotational speeds and/or tangential velocities.

It should be noted that the depicted pump is a gas injection type but that any type of circulation or electromagnetic pump and in fact, any type of pump transporting molten metal may benefit by the inclusion of the present fan diffusing outlet design.

Referring again to FIG. 15, the gas injection inlet is positioned in the base slightly downstream of the line 576 and slightly upstream of the fan diffusing outlet section 574. The upstream location of the gas injection inlet is limited by the desire to prevent gas from being circulated into the volute pumping chamber 562. The gas injection upstream of the fan diffuser element is to allow gas introduction at a relatively lower pressure location. Of course, the gas injection orifices could be multiple and located anywhere including top, sides or bottom of the outlet, as long as they are concentric or if multiple injection is used, it is symmetrical to the outlet access. Advantageously, introduction of the gas in this location with the downstream fan diffusing section high pressure zone reduces the tendency for bubbles to coalesce into a larger pocket which is more difficult to keep entrained in the molten metal.

In general, the present invention provides longer gas residence, slower bubble coalescence formation, high gas dispersion into the metal proportional to peripheral velocity and metal flow, deeper gas penetration into the stationary metal, no gas backflow out of the pump inlet, higher metal flows at similar gas flows of prior designs, no pump flow velocity reduction, no outlet flow pressure fluctuations resulting from large velocity changes and limited vibration and material fatigue due to high resonance stress and hydraulic waves.

Referring now to FIGS. 19-22, a gas injection adapter of the present invention is depicted. Importantly, while the adapter 600 is depicted herein as a component separate from the molten metal base, it is to be noted that the adapter can be constructed as an integral component of the material forming the base as well.

Adapter 600 is comprised of a graphite, ceramic or other molten metal resistant body 601 having an inlet end 602, and an outlet end 604. The body 601 defines a passage 606 within which bifurcating fin 608 is positioned. The fin 108 is depicted as aligned along a longitudinal axis L of the adapter 600; however, the fin can be located elsewhere or could be curved if desired. Bifurcating fin 608 includes a tapered leading edge 610, preferably having an angular increase of between about 5 degrees and 15 degrees with respect to a longitudinal axis L of the adapter 100, and a tapered trailing edge 612, preferably having an angular decrease of between about 2 degrees and 8 degrees with respect to the longitudinal axis of the adapter. Tapered leading edge 608 and tapered trailing edge 610 are joined by a central section 614 having two generally planar side walls 616 that are parallel to one another. The leading edge 610 of the fin 608 is shorter, thus having a larger increasing angle, as compared to the longer trailing edge 612.

Internal walls of passage 606 are formed such that their dimensions substantially mirror that of the leading and trailing edges and central region of fin 608. Moreover, the walls of passage 606 will be relieved in these areas consistent with the area of passage eliminated by the fin 608. Such a configuration mitigates the impact on the flow of molten metal through the adapter by providing a constant or increasing flow area (an area taken at a cross-section perpendicular to the longitudinal axis L) throughout the adapter. Accordingly, interior walls 618 in region 620 increase at an angular rate of between about 5 degrees and 15 degrees generally matching the outer dimension of leading edge 610. Interior walls 621 adjacent the central region 622 can be relatively flat. Interior walls 624 adjacent to the rear region 626 can remain flat or in fact, continue to diverge to provide the apparatus with the benefits of the diffusing fan discussed above. In this manner, turbulence is not introduced into the molten metal stream to an influential level.

Outlet adapter 600 includes a recessed gas injection tube receiving region 628 having chamfered edges 629 to facilitate the seating of a gas injection tube (not shown). Seat 628 includes at least one gas injection port 630 that extends into fin 608 and including two outlet ports 632, providing gas access to molten metal flowing passed fin 608. Of course, many outlet port locations are feasible. For example, the ports can be moved forwardly-rearwardly and higher-lower than shown. Similarly, the angle at which the part is directed into the molten metal stream is adjustable. Therefore, the fin design allows the gas to be injected at a maximum suction point. The greater the suction, the more gas that can be injected and metal treated. Adapter 600 includes side wall holes 634, provided to facilitate the machining of the ports 632.

The bifurcated pump outlet advantageously allows gas injected to be at the load center for maximum residence, maximum flow velocity, and maximum stream penetration. One significant advantage is no volute area constriction is created. In addition, gradual volute discharge area expansion exists to minimize bubble coalescence. Similarly, dual metal flow coalescence occurs for maximum gas retention occurs with no velocity turbulence.

In addition, by design selection of the taper of the side walls at the downstream point, the exist velocity is allowing metal to metal penetration velocity between 4 to 20 ft/sec.

Referring now to FIG. 23, an alternative gas injection tube 700 is shown. In this embodiment, as opposed to a single or double gas inlet port (ex. FIGS. 13-14, and 19-22) a plurality of outlet ports 703. Preferably, each individual port will have an opening dimension no greater than 5% of the overall gas discharge outlet area.

Referring now to FIGS. 24 and 25, an alternative leveling mechanism is depicted. More particularly, a motor mount assembly 800 is shown including among other elements, a primary support plate 803 to which the pump posts can be secured. Four threaded stud elements 805 are secured to the plate 803. Mounting ring 807 is positioned on stud elements 805 and the motor (not shown) secured thereto. Intermediate plate 803 and mounting ring 807, and positioned on studs 805, are adjustment elements 809. Adjustment elements 809 are constructed of tube element 811, threaded adjustment cap 813 and locking ring 815. Adjustment cap 813 includes a threaded outer surface 817 suitable for mating with locking ring 815. The internal bore of locking cap 813 is threaded to mate with studs 805. The design depicted herein facilitates the adjustment of motor ring 807 and hence a motor mounted thereon. Advantageously, a slight adjustment of elements 809 facilitates the proper orientation of the shaft and impeller elements described hereinabove.

A molten metal pump and the components that make up the molten metal pump have been described above in sufficient detail so that one skilled in the art can make and use the device. Directional terms such as "upper," "lower," "vertical," "horizontal" and the like have been used to describe the embodiments depicted in the figures and are not used to limit the location of certain components. A number of alternatives of the above-described embodiments may occur to those skilled in the art upon reading the preceding description. The invention is meant to include all such modifications and alterations that come within the scope of the appended claims and the equivalents thereof.

The invention claimed is:

1. A connector for connecting a post assembly of an associated molten metal pump to a motor mount, the connector comprising:
    a side wall;
    an internal wall extending from the side wall and including an axially aligned opening adapted to receive an elongated rod, the side wall and the internal wall defining a lower receptacle adapted to receive a barrel nut of the post assembly and an upper receptacle adapted to cooperate with a motor mount or a structure connected to the motor mount, the barrel nut including a threaded opening adapted to align with the opening of the internal wall, and a fastener having a first end configured to engage the motor mount and a second end configured to engage the threaded opening of the barrel nut.

2. The connector of claim 1, wherein the side wall includes at least one opening.

3. A molten metal pump comprising the connector of claim 1, and further including:
    an impeller;
    a pump base housing at least partially enclosing the impeller;
    a shaft connected to the impeller; and
    a motor supported by the motor mount and connected to the shaft;
    said post connecting the motor mount to the pump base housing.

4. The molten metal pump of claim 3 wherein said post includes an internal nut oriented to receive an elongated rod.

5. The connector of claim 1, wherein the side wall includes openings adjacent the internal wall.

6. The connector of claim 1 wherein the internal wall and the side wall are integral.

7. The connector of claim 1, wherein said upper receptacle comprises a substantially disk shaped chamber.

8. The connector of claim 7, comprising an externally threaded seat connected to the motor mount and adapted to be received within the upper receptacle.

9. The connector of claim 8 wherein the motor mount or structure includes an opening aligned with the opening in the internal wall, and wherein at least one of the openings has a non-circular periphery.

10. The connector of claim 8 wherein the seat includes at least two passages accommodating fasteners for securing the mounting structure to the motor mount.

11. The connector of claim 8 wherein said seat is disc shaped.

12. The connector of claim 8, wherein said upper receptacle includes an internally threaded surface.

13. A device for providing an adjustable connection between a molten metal pump post and a motor mount for a molten metal pump, said motor mount having a first post receiving side and a second motor receiving side, the device comprising:
    a side wall defining a receptacle dimensioned to receive the post; and an upper portion including internal threads adapted to mount to external threads on the first side of the motor mount or a structure that is connected to the first side of the motor mount and allow adjustment of the of the device along a longitudinal axis of the post; and a fastener having a first end configured to engage the motor mount and a second end configured to engage a cavity in the post.

14. The device of claim 13, further comprising an internal wall extending from the side wall into the receptacle, the internal wall including a central opening.

15. The device of claim 13 wherein the structure is welded to the motor mount.

16. The device of claim 13 wherein said side wall includes a passage in axial alignment with a longitudinal axis of said post.

17. A molten metal pump comprising the device of claim 13, and further including:
an impeller;
a pump base housing at least partially enclosing the impeller;
a shaft connected to the impeller; and
a motor supported by the motor mount and connected to the shaft;
said post connecting the motor mount to the pump base housing.

18. A device for providing an adjustable connection between a molten metal pump post and a motor mount, the device comprising:
a side wall defining a receptacle dimensioned to receive the post;
an upper portion adapted to mount to a bottom surface of the motor mount and allow adjustment of the device in an axial direction defined by a longitudinal axis of the post;
an internal wall dividing the receptacle from the upper portion, the internal wall including a passage; and
a fastener having a first end configured to engage the motor mount and a second end configured to engage a cavity in the post.

19. The device of claim 18 further comprising a threaded fastener for securing an elongated rod to said motor mount.

20. A device for providing an adjustable connection between a molten metal pump post and a motor mount, the device comprising:
a side wall defining a receptacle dimensioned to receive the post;
an upper portion adapted to mount via threads to a bottom surface of the motor mount or a structure that is connected to a bottom surface of the motor mount and allow adjustment of the device in an axial direction defined by the longitudinal axis of the post; and
a fastener having a first end configured to engage the motor mount and a second end configured to engage a cavity in the post.

21. The device of claim 20 further comprising a transverse wall dividing said receptacle from said upper portion wherein said wall includes a passage receiving at least one of an elongated rod disposed within said post and a threaded fastener secured to said motor mount.

22. A connector for connecting a post assembly of an associated molten metal pump to a motor mount, the connector comprising:
a side wall;
an internal wall extending from the side wall and including an axially aligned opening adapted to receive an elongated rod, the side wall and the internal wall defining a lower receptacle adapted to receive a post assembly and an upper receptacle; and
an externally threaded seat adapted to be received within the upper receptacle;
wherein the seat includes at least two passages accommodating fasteners for securing the connector to the motor mount.

* * * * *